United States Patent [19]
Sugimoto et al.

[11] Patent Number: 6,121,394
[45] Date of Patent: *Sep. 19, 2000

[54] METALLOCENE-CATALYZED OLEFIN POLYMERIZATION IN THE ABSENCE OF ALUMINOXANE

[75] Inventors: Ryuichi Sugimoto; Tadashi Asanuma; Tutomu Iwatani; Katsumi Takeuchi; Osamu Uchida, all of Osaka, Japan

[73] Assignee: Mitsui Chemicals, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/450,735

[22] Filed: May 25, 1995

Related U.S. Application Data

[63] Continuation of application No. 08/156,935, Nov. 23, 1993, abandoned, which is a continuation of application No. 07/842,141, Mar. 23, 1992, abandoned.

[30] Foreign Application Priority Data

| Jul. 24, 1990 | [JP] | Japan | 2-193904 |
| Aug. 19, 1990 | [JP] | Japan | 2-202455 |
| Aug. 27, 1990 | [JP] | Japan | 2-222582 |
| Oct. 2, 1990 | [JP] | Japan | 2-262985 |
| Nov. 13, 1990 | [JP] | Japan | 2-303791 |
| Nov. 13, 1990 | [JP] | Japan | 2-303792 |
| Feb. 8, 1991 | [JP] | Japan | 3-017371 |
| Feb. 11, 1991 | [JP] | Japan | 3-018531 |
| Feb. 13, 1991 | [JP] | Japan | 3-019792 |
| Feb. 13, 1991 | [JP] | Japan | 3-019793 |
| Feb. 21, 1991 | [JP] | Japan | 3-027058 |
| Mar. 13, 1991 | [JP] | Japan | 3-047851 |
| Mar. 13, 1991 | [JP] | Japan | 3-047984 |
| Jul. 24, 1991 | [WO] | WIPO | PCT/JP91/00983 |

[51] Int. Cl.⁷ .................................. C08F 4/44
[52] U.S. Cl. .............. 526/124.3; 526/124.1; 526/124.2; 526/129; 526/156; 526/132; 526/133; 526/160; 526/943
[58] Field of Search ............... 526/97, 124, 125, 526/129, 156, 132, 133, 160, 943, 124.1, 124.2, 124.3

[56] References Cited

U.S. PATENT DOCUMENTS

| 3,104,249 | 9/1963 | Clauss et al. | 526/160 |
| 4,659,685 | 4/1987 | Coleman, III et al. | 502/113 |
| 4,892,851 | 1/1990 | Ewen et al. | 502/104 |
| 4,897,455 | 1/1990 | Welborn | 526/129 |
| 4,921,920 | 5/1990 | Collimb-Ciccareni et al. | 526/129.5 |
| 5,003,019 | 3/1991 | Ishimaru et al. | 526/281 |
| 5,086,135 | 2/1992 | Kissin | 526/151 |
| 5,132,380 | 7/1992 | Stevens | 526/134 |
| 5,153,157 | 10/1992 | Hlotky et al. | 526/443 |
| 5,369,196 | 11/1994 | Matsumoto et al. | 526/160 |
| 5,408,017 | 4/1995 | Turner et al. | 526/131 |
| 5,700,750 | 12/1997 | Tsutsui et al. | 526/119 |

FOREIGN PATENT DOCUMENTS

| 0 185 918 A2 | 11/1985 | European Pat. Off. . |
| 0 277 003 A1 | 1/1988 | European Pat. Off. . |
| 0 277 004 A1 | 1/1988 | European Pat. Off. . |
| 0 285 443 A1 | 3/1988 | European Pat. Off. . |
| 277004 | 8/1988 | European Pat. Off. . |
| 0 316 155 A2 | 11/1988 | European Pat. Off. . |
| 58-19309 | 2/1983 | Japan . |
| 61-130314 | 6/1986 | Japan . |
| 61-264010 | 11/1986 | Japan . |
| 1-501950 | 7/1989 | Japan . |
| 1-502036 | 7/1989 | Japan . |
| 1-301704 | 12/1989 | Japan . |
| 3-179005 | 8/1991 | Japan . |
| 3-207703 | 9/1991 | Japan . |
| 3-207704 | 9/1991 | Japan . |
| 1348655 | 3/1974 | United Kingdom . |
| 87-03889 | 7/1987 | WIPO . |
| WO8703889 | 7/1987 | WIPO | 526/153 |

OTHER PUBLICATIONS

J. Am. Chem. Soc., 1986, 108, pp. 7410–7411, "Ethylene Polymerization by a Cationic Dicyclopentadienylzirconium(IV) Alkyl Complex", Jordan et al.

Langmuir 1988, 4, pp. 1212–1214, "Organometallic Molecule–Support Interactions, Highly Active Organozirconium Hydrogenation Catalysts . . . ", Dahmen et al.

Makromol, Chem., 190, No. 10, Oct., 1989, "Behaviour of Homogeneous Catalysts for Propene Polymerization in Methylene Chloride", Longo et al. pp. 2357–2361.

J. Am. Chem. Soc., 1989, 111, pp. 2728–2729, "Ionic, Base–Free Zirconocene Catalysts for Ethylene Polymerization", Hlatky et al.

Hawley's Condensed Chemical Dictionary, John Wiley & Sons, Inc., 13th Edition, p. 718, 1997.

*Primary Examiner*—David W. Wu
*Assistant Examiner*—Roberto Rabago
*Attorney, Agent, or Firm*—Burns, Doane, Swecker, & Mathis, L.L.P.

[57] ABSTRACT

The present invention is directed to a method for polymerizing an α-olefin characterized by using a catalyst system which is obtained by reacting a halogenated metallocene compound with an organometallic compound, and then bringing the resultant reaction product into contact with a compound which will be a stable anion by reaction with the reaction product of the halogenated metallocene compound and the organometallic compound.

When the method of the present invention is carried out, a polyolefin can be obtained by the use of the inexpensive catalyst in a high activity per unit amount of the catalyst.

8 Claims, 5 Drawing Sheets

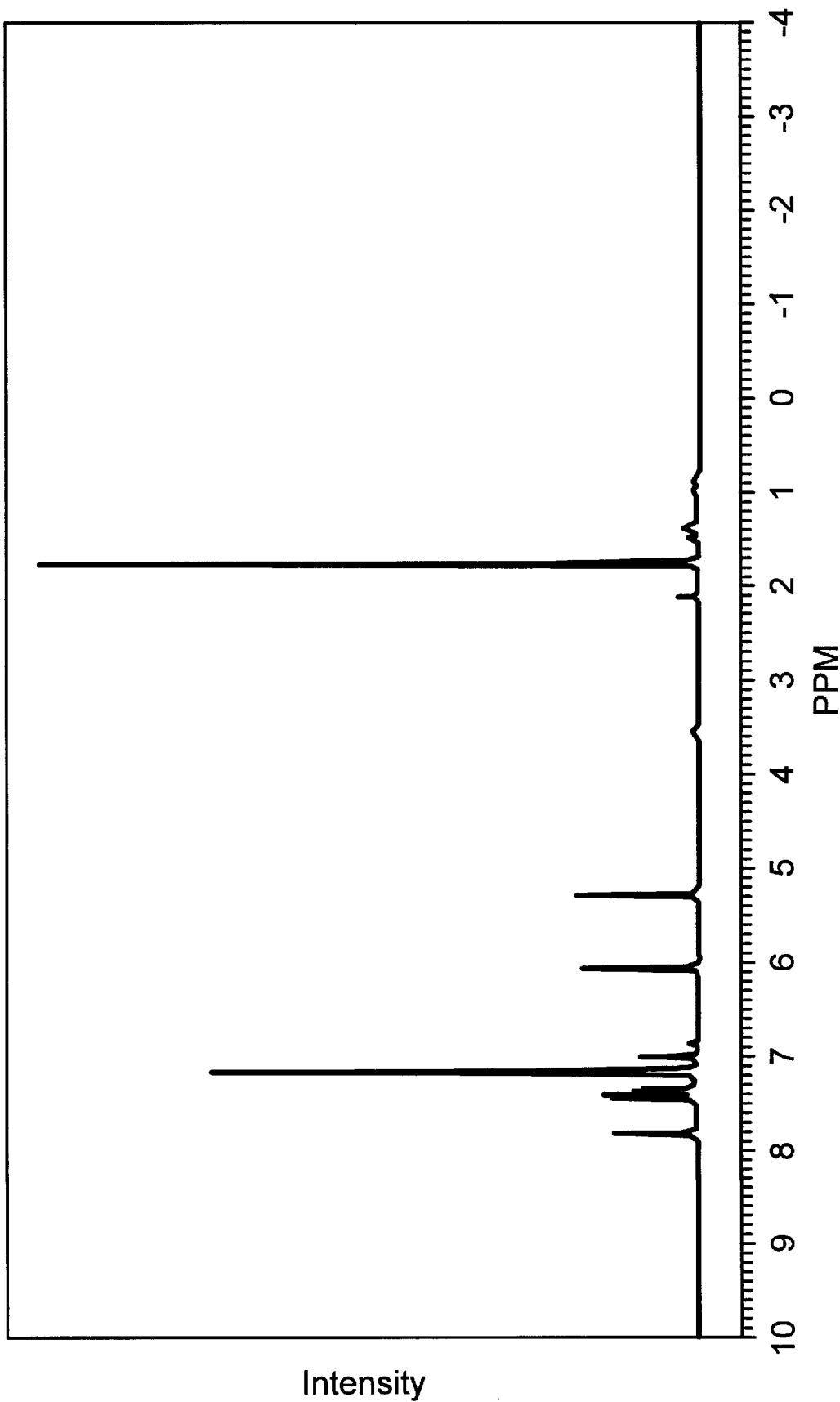

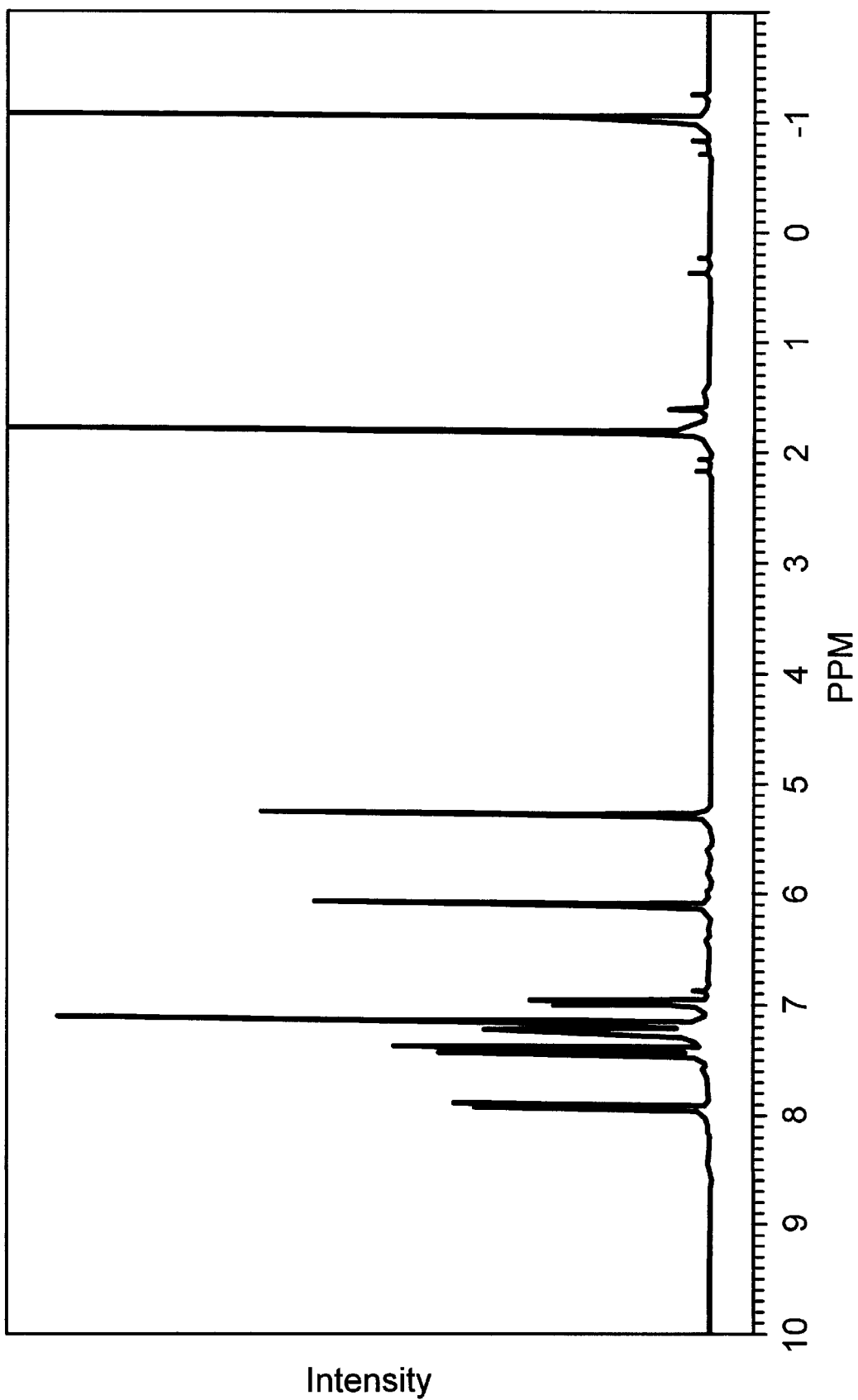

METALLOCENE-CATALYZED OLEFIN POLYMERIZATION IN THE ABSENCE OF ALUMINOXANE

This application is a continuation, of application Ser. No. 08/156,935, filed Nov. 23, 1993. now abandoned which is a continuation of Application No. 07/842,141, filed Mar. 23, 1992, now abandoned.

TECHNICAL FIELD

The present invention relates to a polymerization catalyst for an α-olefin and a method for preparing a poly-α-olefin by the use of the same. More specifically, it relates to a novel catalyst system using a halogenated metallocene compound and a method for preparing a poly-α-olefin by the use of this catalyst in a high activity per unit amount of the catalyst.

BACKGROUND ART

A known polymerization catalyst for an olefin comprises a combination of a metallocene compound having a group with conjugated pi-electrons, particularly cyclopentadiene and its derivative as ligands and an alkylaluminoxane obtained by the reaction of trialkylaluminum and water. For example, Japanese Patent Application Laid-open No. 19309/1983 discloses a polymerization process of an olefin by the use of a catalyst composed of biscyclopentadienylzirconium dichloride and methylaluminoxane. Furthermore, Japanese Patent Application Laid-open Nos. 130314/1986, 264010/1986, 301704/1989 and 41303/1990 disclose preparation methods of isotactic poly-α-olefins or syndiotactic poly-α-olefins and polymerization catalysts which can be used to prepare these poly-α-olefins having a steric regularity, but the disclosed catalysts all utilize aluminoxanes as co-catalysts.

On the other hand, researches have heretofore been made into an aluminoxane-free homogeneous Ziegler-Natta catalyst system, and it has been known that this kind of catalyst has a polymerization activity for olefins, though this activity is low. The active species of this catalyst is considered to be a cationic metallocene compound or an ion pair type metallocene complex.

In recent years, it has been reported that an isolated cationic metallocene compound having cyclopentadiene or its derivative as a ligand can singly exert the polymerization activity for olefins, even if methylaluminoxane as the co-catalyst does not coexist.

For example, in R. F. Jordan et al., J. Am. Chem. Soc., Vol. 108, 1986, p. 7410–7411, it has been reported that a zirconium cationic complex having tetraphenylborane as an anion and having two cyclopentadienyl groups and a methyl group as ligands can be isolated by utilizing a donor such as tetrahydrofuran as a ligand, and the isolated complex exerts a polymerization activity for ethylene in methylene chloride.

Furthermore, Turner et al. have reported in J. Am. Chem. Soc., Vol. 111, 1989, p. 2728–2729, Japanese Patent Disclosure (Kohyo) Nos. 501950/1989 and 502036/1989 that an ion pair type metallocene complex has a polymerization activity for olefins, and this type of metallocene complex is composed of a metallic compound having a cyclopentadienyl group or its derivative as a ligand containing at least one substituent capable of reacting with a proton and a compound which has a cation capable of donating the proton and which can feed a stable anion. In Zambelli et al., Maclomolecules, Vol. 22, 1989, p. 2186–2189, it has been reported that propylene is polymerized with the aid of a catalyst comprising the combination of a zirconium compound having a derivative of a cyclopentadienyl group as a ligand, trimethylaluminum and fluorodimethylaluminum to obtain an isotactic polypropylene. Also in this case, the active species is considered to be the ion pair type metallocene compound.

In addition, Marks et al. have reported in Langmuir, Vol. 4, No. 5, 1988, p. 1212–1214 that a catalyst supporting a dimethylzirconium complex having a cyclopentadienyl derivative as a ligand on alumina completely dehydrated by a heat treatment at about 1000° C. exerts a polymerization activity for ethylene. This catalyst system is also considered to be a cationic metallocene compound. However, in the connected column of the literature, the description regarding ethylene is seen, but any α-olefin is not referred to.

The polymerization methods of olefins by the use of a catalyst comprising the combination of the metallocene compound and the alkylaluminoxane disclosed in Japanese Patent Application Laid-open No. 19309/1983 and the like have the feature that the polymerization activity per unit of a transition metal is high. However, in these methods, the polymerization activity per unit of the metallocene compound is high, but the expensive aluminoxane is used in large quantities, and therefore the polymerization activity per unit of the aluminoxane is not so high. In consequence, there is the problem that the production cost of the polymer is high and the other problem that after the polymerization, the removal of the aluminoxane from the produced polymer is very difficult and a large amount of the catalyst residue remains in the polymer.

On the other hand, in the methods of R. F. Jordan et al. and Turner et al., no alkylaluminoxane is used and the cationic zirconium complexes are utilized as the catalysts. Therefore, the above-mentioned problem regarding the alkylaluminoxane is not present. However, the polymerization activity of these catalysts is much lower as compared with that of the catalyst systems using the alkylaluminoxane and most of the complex catalysts cannot polymerize α-olefins having 3 or more carbon atoms. Furthermore, these methods require a dimethyl complex or the like which can be obtained by alkylating a dichloro complex with an expensive alkylating agent such as methyllithium or a methyl Grignard reagent, and they have the problem regarding the yield of the alkylation, which increases the production cost of the catalysts. In addition, these alkylated metallocene compounds are unstable, and in particular, their solutions in a hydrocarbon solvent or the like easily decompose owing to a trace amount of impurities such as water and oxygen, or light. Accordingly, it is difficult to store the catalysts in the state of the solution, and thus each metallocene solution must be prepared afresh before the polymerization. Moreover, at the time of the polymerization, the contamination of the monomer and the solvent with the impurities must be inhibited to the utmost. In the case that an olefin is polymerized by the use of the Ziegler system catalyst, the impurities can be removed from the monomer and/or the solvent by treating the same with an organometallic compound, particularly an alkylaluminum compound. This removal manner can be applied to the case where the ion pair system catalyst is used, and when the monomer and/or the solvent which has been treated with the alkylaluminum is employed, the polymerization activity of the catalyst for the olefin is improved to some extent, but nevertheless, this activity is poorer as compared with the combined catalyst system using the alkylaluminoxane as the co-catalyst. In the method of Zambelli et al., propylene is polymerized with the aid of the catalyst system comprising trimethylaluminum, dimethylaluminum fluoride and the zirconium complex to obtain an isotactic polypropylene, as described above, and the expensive aluminoxane and the dimethyl complex are not used. However, in this kind of catalyst, the organometallic compound containing fluorine is used and the polymerization activity is extremely low. This polymerization activity can be slightly improved by using a halogenated hydrocarbon such as methylene chloride as the reaction solvent, but nevertheless it is still low, and the halogenated hydrocarbon, since being poisonous, is not preferable as the solvent.

DISCLOSURE OF THE INVENTION

The present inventors have intensively researched on a stable catalyst system by which the above-mentioned problems can be solved and by which an α-olefin can be polymerized with a high activity without using an alkylaluminoxane, and as a result, the present invention has been completed. That is, the present invention is directed to a method for polymerizing an α-olefin characterized by using a catalyst system which can be obtained by reacting a halogenated metallocene compound with an organometallic compound, and then bringing the resultant reaction product into contact with a compound which will be a stable anion by reaction with the above-mentioned reaction product of the halogenated metallocene compound and the organometallic compound.

BRIEF DESCRIPTION OF THE DRAWINGS

FIG. 1 shows a proton NMR spectrum of isopropyl-(cyclopentadienyl-1-fluorenyl)zirconium dichloride.

FIG. 5 shows a proton NMR spectrum of isopropyl-(cyclopentadienyl-1-fluorenyl)zirconium dimethyl complex.

BEST MODE FOR CARRYING OUT THE INVENTION

Figure 2A:
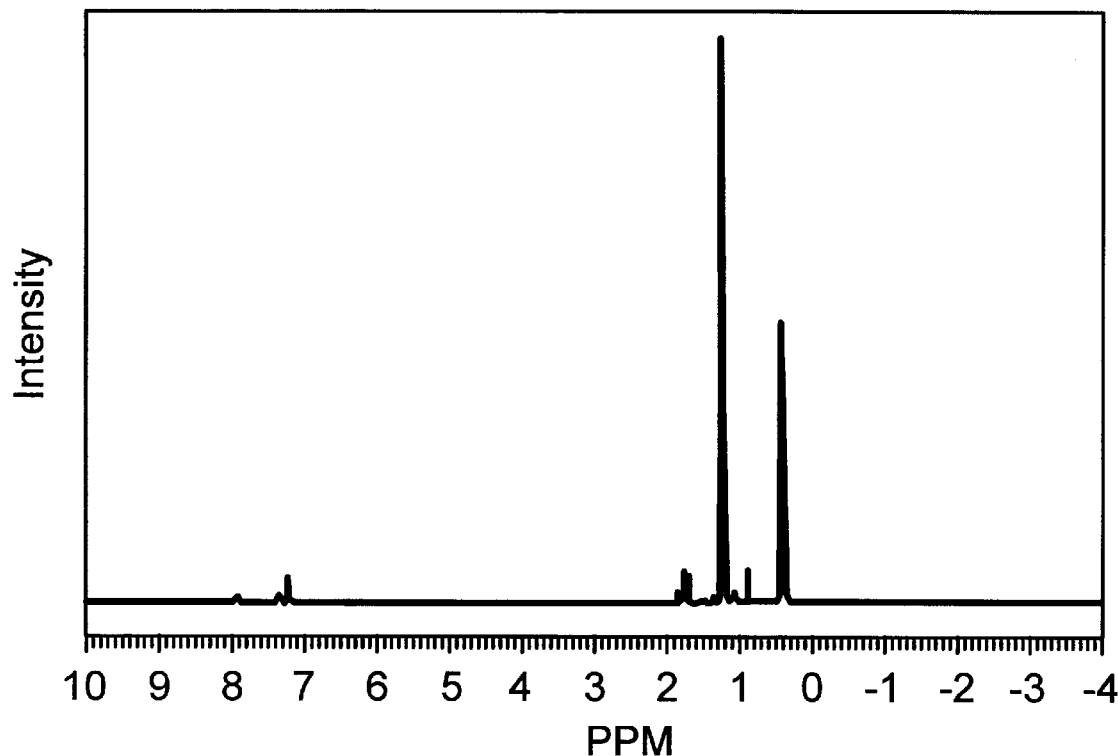
FIG. 2 shows a proton NMR spectrum measured 10 minutes after isopropyl(cyclopentadienyl-1-fluorenyl)-zirconium dichloride was mixed with triethylaluminum, and in FIG. 2, (a) is a general view and (b) is a partially enlarged view.

An example of a halogenated metallocene compound of a catalyst system which can be used in the present invention is a compound represented by the formula (I) or (II)

wherein A and B or A' and B' may be mutually identical or different and they are unsaturated hydrocarbon residues coordinated to a central atom; R is a divalent straight-chain saturated hydrocarbon residue which may have a side chain, or a residue in which a part or all of the carbon atoms of its straight chain may be substituted by silicon atoms, germanium atoms or tin atoms; M is a titanium atom, a zirconium atom or a hafnium atom; and X is a halogen atom.

An example of the unsaturated hydrocarbon residue represented by A, B, A' or B' is a monocyclic or a polycyclic group having 5 to 50 carbon atoms and having conjugated pi-electrons, and a typical example of the residue is a cyclopentadienyl in which a part or all of the hydrogen atoms may be substituted by hydrocarbon residues each having 1 to 10 carbon atoms (the hydrocarbon residue may have a structure in which the terminal thereof may be bonded to the cyclopentadiene ring again, and a part of the carbon atoms of the hydrocarbon residue may be replaced with atoms in the group XIV of the periodic table, or the hydrocarbon residue may be a halogen) or a polycyclic aromatic hydrocarbon residue such as indenyl or fluorenyl in which a part or all of the hydrogen atoms may be substituted by hydrocarbon residues each having 1 to 10 carbon atoms.

An example of the divalent group represented by R is a methylene group represented by the following formula (III), or a silylene group, a germylene group or a stanylene group in which a part or all of the carbon atoms of the above-mentioned methylene group are substituted by silicon atoms, germanium atoms or tin atoms:

$$—(R'_2C)_n—(R'_2Si)_m—(R'_2Ge)_p—(R'_2Sn)_q— \qquad (III)$$

(wherein R' may be identical or different and it is a hydrogen atom or a hydrocarbon residue having 1 to 20 carbon atoms; each of n, m, p and q is an integer of from 0 to 4 which meets $1 \leq n+m+p+q \leq 4$).

An example of X is a fluorine atom, a chlorine atom, a bromine atom or an iodine atom.

Typical examples of the halogenated metallocene compound represented by the formula (I) are as follows:

Bis(cyclopentadienyl)zirconium dichloride, bis-(methylcyclopentadienyl)zirconium dichloride, bis(1,2-dimethylcyclopentadienyl)zirconium dichloride, bis(1,3-dimethylcyclopentadienyl)zirconium dichloride, bis(1,2,3-trimethylcyclopentadienyl)zirconium dichloride, bis(1,2,4-trimethylcyclopentadienyl)zirconium dichloride, bis-(1,2,3,4-tetramethylcyclopentadienyl)zirconium dichloride, bis(pentamethylcyclopentadienyl)zirconium dichloride, bis-(ethylcyclopentadienyl)zirconium dichloride, bis(1,2-diethylcyclopentadienyl)zirconium dichloride, bis(1,3-diethylcyclopentadienyl)zirconium dichloride, bis (isopropylcyclopentadienyl)zirconium dichloride, bis (phenylpropylcyclopentadienyl)zirconium dichloride, bis(t-butylcyclopentadienyl)zirconium dichloride, bis(indenyl) zirconium dichloride, bis(4-methyl-1-indenyl)zirconium dichloride, bis(5-methyl-1-indenyl)zirconium dichloride, bis(6-methyl-1-indenyl)zirconium dichloride, bis(7-methyl-1-indenyl)zirconium dichloride, bis(5-methoxy-1-indenyl)-zirconium dichloride, bis(2,3-dimethyl-1-indenyl)zirconium dichloride, bis(4,7-dimethyl-1-indenyl)zirconium dichloride, bis(4,7-dimethoxy-1-indenyl)zirconium dichloride, bis(fluorenyl)zirconium dichloride, bis (trimethylsilyl-cyclopentadienyl)zirconium dichloride, bis (trimethylgermyl-cyclopentadienyl)zirconium dichloride, bis(trimethylstanyl-cyclopentadienyl)zirconium dichloride, bis(trifluoromethyl-cyclopentadienyl)zirconium dichloride, (cyclopentadienyl)-(methylcyclopentadienyl)zirconium dichloride, (cyclopentadienyl)(dimethylcyclopentadienyl) zirconium dichloride, (cyclopentadienyl) (trimethylcyclopentadienyl)zirconium dichloride, (cyclopentadienyl)(tetramethylcyclopentadienyl)zirconium dichloride, (cyclopentadienyl)

(pentamethylcyclopentadienyl)zirconium dichloride, (cyclopentadienyl)(ethylcyclopentadienyl)zirconium dichloride, (cyclopentadienyl)(diethylcyclopentadienyl) zirconium dichloride, (cyclopentadienyl) (triethylcyclopentadienyl)zirconium dichloride, (cyclopentadienyl)(tetraethylcyclopentadienyl)zirconium dichloride, (cyclopentadienyl)(pentaethylcyclopentadienyl) zirconium dichloride, (cyclopentadienyl)(fluorenyl) zirconium dichloride, (cyclopentadienyl)(2,7-di-t-butylfluorenyl)zirconium dichloride, (cyclopentadienyl) (octahydrofluorenyl)zirconium dichloride, (cyclopentadienyl)(4-methoxyfluorenyl)zirconium dichloride, (methylcyclopentadienyl)(t-butylcyclopentadienyl)zirconium dichloride, (methylcyclopentadienyl)(fluorenyl)zirconium dichloride, (methylcyclopentadienyl)(2,7-di-t-butylfluorenyl)zirconium dichloride, (methylcyclopentadienyl)(octahydrofluorenyl) zirconium dichloride, (methylcyclopentadienyl)(4-methoxyfluorenyl)zirconium dichloride, (dimethylcyclopentadienyl)(fluorenyl)zirconium dichloride, (dimethylcyclopentadienyl)(2,7-di-t-butylfluorenyl) zirconium dichloride, (dimethylcyclopentadienyl) (octahydrofluorenyl)zirconium dichloride, (dimethylcyclopentadienyl)(4-methoxyfluorenyl)zirconium dichloride, (ethylcyclopentadienyl)(fluorenyl)zirconium dichloride, (ethylcyclopentadienyl)(2,7-di-t-butylfluorenyl) zirconium dichloride, (ethylcyclopentadienyl) (octahydrofluorenyl)zirconium dichloride, (ethylcyclopentadienyl)(4-methoxyfluorenyl)zirconium dichloride, (diethylcyclopentadienyl)(fluorenyl)zirconium dichloride, (diethylcyclopentadienyl)(2,7-di-t-butylfluorenyl)zirconium dichloride, (diethylcyclopentadienyl)(octahydrofluorenyl)zirconium dichloride and (diethylcyclopentadienyl)(4-methoxyfluorenyl)zirconium dichloride.

Additional examples of the halogenated metallocene compound represented by the formula (I) include similar complexes in which the zirconium atom is replaced with a titanium atom or a hafnium atom, and similar complexes in which the chlorine atom is replaced with a bromine atom, a fluorine atom or an iodine atom.

Typical examples of the halogenated metallocene compound represented by the formula (II) are as follows:

Ethylenebis(cyclopentadienyl)zirconium dichloride, ethylenebis(methylcyclopentadienyl)zirconium dichloride, ethylenebis(2,3-dimethylcyclopentadienyl)zirconium dichloride, ethylenebis(2,4-dimethylcyclopentadienyl) zirconium dichloride, ethylenebis(2,3,4-trimethylcyclopentadienyl)zirconium dichloride, ethylenebis(2,3,5-trimethylcyclopentadienyl)zirconium dichloride, ethylenebis(2,3,4,5-tetramethylcyclopentadienyl)zirconium dichloride, ethylenebis(ethylcyclopentadienyl)zirconium dichloride, ethylene-bis(2,3-diethylcyclopentadienyl)zirconium dichloride, ethylenebis(2,4-diethylcyclopentadienyl) zirconium dichloride, ethylenebis (isopropylcyclopentadienyl)zirconium dichloride, ethylenebis(phenylpropylcyclopentadienyl)zirconium dichloride, ethylenebis(t-butylcyclopentadienyl)zirconium dichloride, ethylenebis(indenyl)zirconium dichloride, ethylenebis(4-methyl-1-indenyl)zirconium dichloride, ethylenebis(5-methyl-1-indenyl)zirconium dichloride, ethylenebis(6-methyl-1-indenyl)zirconium dichloride, ethylenebis(7-methyl-1-indenyl)zirconium dichloride, ethylenebis(5-methoxy-1-indenyl)zirconium dichloride, ethylenebis(2,3-dimethyl-1-indenyl)zirconium dichloride, ethylenebis(4,7-dimethyl-1-indenyl)zirconium dichloride, ethylenebis(4,7-dimethoxy-1-indenyl)zirconium dichloride, ethylenebis(fluorenyl)zirconium dichloride, ethylenebis-(4,5,6,7-tetrahydro-1-indenyl)zirconium dichloride, ethylenebis(fluorenyl)zirconium dichloride, ethylene (cyclopentadienyl)(methylcyclopentadienyl)zirconium dichloride, ethylene(cyclopentadienyl) (dimethylcyclopentadienyl)zirconium dichloride, ethylene (cyclopentadienyl)(trimethylcyclopentadienyl)zirconium dichloride, ethylene(cyclopentadienyl) (tetramethylcyclopentadienyl)zirconium dichloride, ethylene(cyclopentadienyl)(ethylcyclopentadienyl) zirconium dichloride, ethylene(cyclopentadienyl) (diethylcyclopentadienyl)zirconium dichloride, ethylene (cyclopentadienyl)(triethylcyclopentadienyl)zirconium dichloride, ethylene(cyclopentadienyl) (tetraethylcyclopentadienyl)zirconium dichloride, ethylene (cyclopentadienyl)(fluorenyl)zirconium dichloride, ethylene (cyclopentadienyl)(2,7-di-t-butylfluorenyl)zirconium dichloride, ethylene(cyclopentadienyl)(2,7-dichlorofluorenyl)zirconium dichloride, ethylene (cyclopentadienyl)(octahydrofluorenyl)zirconium dichloride, ethylene(cyclopentadienyl)(4-methoxyfluorenyl)zirconium dichloride, ethylene (methylcyclopentadienyl)(t-butylcyclopentadienyl) zirconium dichloride, ethylene(methylcyclopentadienyl) (fluorenyl)zirconium dichloride, ethylene (methylcyclopentadienyl)(2,7-di-t-butylfluorenyl)zirconium dichloride; ethylene(methylcyclopentadienyl) (octahydrofluorenyl)zirconium dichloride, ethylene (methylcyclopentadienyl)(4-methoxyfluorenyl)zirconium dichloride, ethylene(dimethylcyclopentadienyl)(fluorenyl) zirconium dichloride, ethylene(dimethylcyclopentadienyl) (2,7-di-t-butylfluorenyl)zirconium dichloride, ethylene (dimethylcyclopentadienyl)(octahydrofluorenyl)zirconium dichloride, ethylene(dimethylcyclopentadienyl)(4-methoxyfluorenyl)zirconium dichloride, ethylene (ethylcyclopentadienyl)(fluorenyl)zirconium dichloride, ethylene(ethylcyclopentadienyl)(2,7-di-t-butylfluorenyl) zirconium dichloride, ethylene(ethylcyclopentadienyl) (octahydrofluorenyl)zirconium dichloride, ethylene (ethylcyclopentadienyl)(4-methoxyfluorenyl)zirconium dichloride, ethylene(diethylcyclopentadienyl)(fluorenyl) zirconium dichloride, ethylene(diethylcyclopentadienyl)(2, 7-di-t-butylfluorenyl)zirconium dichloride, ethylene (diethylcyclopentadienyl)(octahydrofluorenyl)zirconium dichloride, ethylene(diethylcyclopentadienyl)(4-methoxyfluorenyl)zirconium dichloride, ethylene (cyclopentadienyl)(4,5-methylenephenanthrene)zirconium dichloride, ethylenebis(trimethylsilylcyclopentadienyl) zirconium dichloride, ethylenebis (trimethylgermylcyclopentadienyl)zirconium dichloride, ethylenebis(trimethylstanylcyclopentadienyl) zirconium dichloride and ethylenebis (trifluoromethylcyclopentadienyl)zirconium dichloride.

Other examples of the halogenated metallocene compound represented by the formula (II) include the divalent groups in which the ethylene group in a cross-linked portion is replaced with an isopropylidene group, a cyclopentylidene group, a cyclohexylidene group, a methylphenylmethylene group, a diphenylmethylene group, a 1,4-cyclopentane-di-ylidene group, a 1,4-cyclohexane-di-ylidene group, a dimethylgermylene group or a dimethylstanylene group. Additional examples include similar complexes in which the zirconium atom is replaced with a titanium atom or a hafnium atom, and similar complexes in which the chloride is replaced with a bromide, an iodide and a fluoride.

An example of the halogenated metallocene compound which can be used in the present invention is a compound represented by the formula (IV)

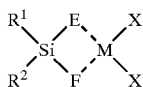 (IV)

wherein each of E and F is a di- or tri-substituted cyclopentadienyl group having a hydrocarbon residue having 1 to 10 carbon atoms, a silyl group or a halogen atom as a substituent; $R^1$ and $R^2$ may be identical or different and they are bonded to silicon which is linked with the two cyclopentadienyl groups, and each of $R^1$ and $R^2$ is a hydrogen atom or a hydrocarbon residue having 1 to 10 carbon atoms; M is a titanium atom, a zirconium atom or a hafnium atom; and X is a halogen atom.

Each example of E and F is a di- or tri-substituted cyclopentadienyl group in which a part of the hydrogen atoms is replaced with hydrocarbon residues having 1 to 10 carbon atoms, silyl groups or halogen atoms.

Each of $R^1$ and $R^2$ is the substituent bonded to silicon which is linked with the two cyclopentadienyl groups, and each example of $R^1$ and $R^2$ is a hydrogen atom or a hydrocarbon residue having 1 to 10 carbon atoms such as methyl, ethyl, propyl, butyl, pentyl, hexyl, cyclopentyl, cyclohexyl or phenyl. Furthermore, they may be identical or different.

An example of X is a fluorine atom, a chlorine atom, a bromine atom or an iodine atom.

Typical examples of the halogenated metallocene compound represented by the formula (IV) are as follows:

Dimethylsilylenebis(3-methylcyclopentadienyl)zirconium dichloride, dimethylsilylenebis(2,4-dimethylcyclopentadienyl)zirconium dichloride, dimethylsilylenebis(2,4-diethylcyclopentadienyl)zirconium dichloride, dimethylsilylenebis(2,3,5-trimethylcyclopentadienyl)zirconium dichloride, dimethylsilylenebis(2,4-di-t-butylcyclopentadienyl)zirconium dichloride, dimethylsilylenebis(phenylcyclopentadienyl)zirconium dichloride, dimethylsilylenebis(3-ethylcyclopentadienyl)zirconium dichloride, dimethylsilylenebis(2,4-diphenylcyclopentadienyl)zirconium dichloride, dimethylsilylenebis(2,3,5-triethylcyclopentadienyl)zirconium dichloride, dimethylsilylenebis(3-isopropylcyclopentadienyl)zirconium dichloride, dimethylsilylenebis(3-phenylpropylcyclopentadienyl)zirconium dichloride, dimethylsilylenebis(3-t-butylcyclopentadienyl)zirconium dichloride, dimethylsilylene(methylcyclopentadienyl)(2,4-dimethylcyclopentadienyl)zirconium dichloride, dimethylsilylene(methylcyclopentadienyl)(2,3,5-trimethylcyclopentadienyl) zirconium dichloride, dimethylsilylene(2,4-dimethylcyclopentadienyl)(2,3,5-trimethylcyclopentadienyl)zirconium dichloride, dimethylsilylene(cyclopentadienyl)(tetramethylcyclopentadienyl)zirconium dichloride, dimethylsilylene(2,4-dimethylcyclopentadienyl)(3-ethylcyclopentadienyl)zirconium dichloride, dimethylsilylene(2,4-dimethylcyclopentadienyl)(2,4-diethylcyclopentadienyl)zirconium dichloride, dimethylsilylene(methylcyclopentadienyl)(2,3,5-trimethylcyclopentadienyl)zirconium dichloride, dimethylsilylene(methylcyclopentadienyl)(t-butylcyclopentadienyl)zirconium dichloride and dimethylsilylene(methylcyclopentadienyl) (phenylcyclopentadienyl)zirconium dichloride. Additional examples of the halogenated metallocene compound represented by the formula (IV) include similar compounds in which the dimethylenesilylene group is replaced with a methylphenylsilylene group, a diethylsilylene group, a diphenylsilylene group, an ethylphenylsilylene group, a dipropylsilylene group and a dibenzylsilylene group. Other examples of the halogenated metallocene compound represented by the formula (IV) include similar complexes in which the zirconium atom is replaced with a titanium atom or a hafnium atom, and similar complexes in which the chloride is replaced with a bromide, an iodide and a fluoride.

An example of the organometallic compound with which the halogenated metallocene compound is treated has a metallic atom in the group I, II, XII or XIII of the periodic table, above all, preferably aluminum, zinc or magnesium to which a halogen atom, an oxygen atom, a hydrogen atom or a residue such as alkyl, alkoxy or aryl is bonded. In the case that the plural members of the latter atoms and residues are used, they may be identical or different, but at least one of them should be the alkyl group. An example of the organometallic compound is an alkylmetal compound having one or more of the alkyl residues of 1 to 12 carbon atoms, an alkylmetal halide or an alkylmetal alkoxide having the above-mentioned alkyl residue and another atom or residue. Above all, an alkylaluminum compound having at least one alkyl residue of 2 or more carbon atoms is used suitably.

Preferable examples of the organometallic compound in which the metallic atom is aluminum are as follows:

Triethylaluminum, tripropylaluminum, triisopropylaluminum, tributylaluminum, triisobutylaluminum, tripentylaluminum, trihexylaluminum, triheptylaluminum, trioctylaluminum, tridecylaluminum, isoprenylaluminum, diethylaluminum hydride, diisopropylaluminum hydride, diisobutylaluminum hydride, diethylaluminum chloride, dipropylaluminum chloride, diisopropylaluminum chloride, diisobutylaluminum chloride, diethylaluminum ethoxide, diisopropylaluminum isopropoxide, ethylaluminum sesquichloride, isopropylaluminum sesquichloride, isobutylaluminum sesquichloride, ethylaluminum dichloride, isopropylaluminum dichloride, isobutylaluminum dichloride and ethylaluminum diisopropoxide.

Preferable examples of the organometallic compound in which the metallic atom is zinc include diethylzinc, diphenylzinc and divinylzinc. Preferable examples of the organometallic compound in which the metallic atom is magnesium include alkylmagnesium halides such as methylmagnesium chloride, methylmagnesium bromide, ethylmagnesium chloride, propylmagnesium chloride and butylmagnesium chloride; and dialkylmagnesium such as dimethylmagnesium, diethylmagnesium, dibutylmagnesium, dihexylmagnesium and butylethylmagnesium.

No particular restriction is put on the process for treating the halogenated metallocene compound with the organometallic compound, and this treatment can be achieved by merely mixing both the materials. In general, the halogenated metallocene compound is in a solid state and the organometallic compound is often in a liquid or a solid state, and so the above-mentioned treatment is preferably carried out in a hydrocarbon solvent. Examples of this hydrocarbon solvent include saturated hydrocarbon compounds such as propane, butane, isobutane, pentane, hexane, heptane, octane, nonane, decane, cyclopentane, cyclohexane, cycloheptane and methylcyclohexane; and aromatic hydrocarbon compounds such as benzene, toluene and xylene.

The solubility of the halogenated metallocene compound in the hydrocarbon solvent is usually very low, but when the organometallic compound is added thereto and the above-mentioned treatment is then carried out, the reaction product from the halogenated metallocene compound contacted with the organometallic compound is readily soluble in the hydrocarbon solvent, and even if it has a high concentration, a homogeneous solution can be obtained. It has been preferably found that the reaction product of the halogenated metallocene compound and the organometallic compound is very stable to light, heat and a small amount of impurities in the hydrocarbon solvent. The reaction product in the hydrocarbon solvent is extremely stable in contrast to the fact that an alkylmetallocene compound obtained by alkylating the halogenated metallocene compound with an alkylating agent is unstable in the hydrocarbon solvent. Therefore, even if the solution is stored for a long period of time, the metallocene compound does not decompose to produce insolubles and the activity of the reaction product as the polymerization catalysts for olefins neither deteriorates nor disappears, and thus the reaction product can stably be stored for a long time. The characteristics of the reaction product obtained by this reaction have not been elucidated so far, but it is definite from the difference of the stability in the hydrocarbon solvent that the alkylmetallocene compound obtained by alkylating the halogenated metallocene compound with the aid of the organometallic compound is not merely present in the reaction product. For example, Kaminsky et al. have reported in Liebigs Ann. Chem., 1975, p. 424–437 that the reaction of dicyclopentadienylzirconium dichloride as the halogenated metallocene compound and triethylaluminum compound as the organometallic compound produces about 10 kinds of products. Furthermore, E. Negishi et al. have reported in Tetrahedron Lett., Vol. 27, 1986, p. 2829 that the dialkylmetallocene compound having an alkyl group of 2 or more carbon atoms cannot be stored stably at room temperature and it decomposes to produce "ZIRCONOCENE". As described above, the reaction product obtained by treating the halogenated metallocene compound with the organometallic compound has not been elucidated in the structure thereof so far, but it becomes a highly active species when used as the polymerization catalysts for α-olefins, in contrast to the alkylmetallocene compound.

It has been known that in the case that an α-olefin is polymerized by the use of a conventional alkylmetallocene compound, catalytic activity does not start immediately, even when the metallocene compound is brought into contact with a compound which will become a stable anion, and a long induction time of 1 to 15 minutes or more is taken and afterward the polymerization reaction begins vigorously. However, in the case that the product obtained by treating the halogenated metallocene compound with the organometallic compound is used to polymerize the α-olefin as in the present invention, such a phenomenon is not be observed, and immediately when the above-mentioned product is brought into contact with the compound which will become a stable anion, the polymerization reaction begins. This is considered to be attributable to the fact that the activator of the present invention is different from the activator formed by using the alkylmetallocene compound.

The amount of the organometallic compound is from 1 to 1000 mols, preferably from 2 to 500 mols per mol of the halogenated metallocene compound. No particular restriction is put on a treatment temperature, but in general, the treatment is preferably carried out at a temperature of from −20 to 100° C. Furthermore, no particular restriction is put on a temperature at which a mixture thereof is stored, but it is preferred that the mixture is stored at the same temperature of from −20 to 100° C.

No particular restriction is put on a treatment time, and if both of the materials are in a solution state, the treatment time is a time until they have been uniformly mixed. If insolubles are present, they should be dissolved in the solvent, and after they have been completely dissolved, the mixture can be used at any time. Needless to say, the mixture may be beforehand prepared and stored until it will be actually used. No particular restriction is put on the concentration of the reaction product in the hydrocarbon solvent, because the reaction product is stable even at the high concentration as described above, but usually the molar concentration of the reaction product is from $10^{-7}$ to 1 mol per liter, preferably from $10^{-5}$ to 0.1 mol per liter in terms of the mol of the metallocene compound.

In the present invention, the compound which will become a stable anion when reacted with the reaction product of the halogenated metallocene compound and the organometallic compound is an ionic compound or an electrophilic compound formed from an ion pair of a cation and an anion, and can be reacted with the reaction product of the halogenated metallocene compound and the organometallic compound to become a stable ion and to thereby form the polymerization activator. This ionic compound can be represented by the formula (V).

$$[Q]_m[Y]_{m^-} \tag{V}$$

Q is a cationic component of the ionic compound, and its examples include carbonium cation, tropylium cation, ammonium cation, oxonium cation, sulfonium cation and phosphonium cation. Additional examples include cations of metals and cations of organometals which are easily reduced. These cations may be not only cations capable of providing protons as disclosed in Japanese Patent Disclosure (Kohyo) No. 501950/1989 and the like but also cations which cannot provide the protons. Typical examples of these cations include triphenylcarbonium, diphenylcarbonium, cycloheptatrienylium, indenium, triethylammonium, tripropylammonium, tributylammonium, N,N-dimethylanilinium, dipropylammonium, dicyclohexylammonium, triphenylphosphonium, trimethylsulfonium, tris(dimethylphenyl)phosphonium, tris (methylphenyl)phosphonium, triphenylsulfonium, triphenyloxonium, triethyloxonium, pyrylium, silver ion, gold ion, platinum ion, copper ion, palladium ion, mercury ion and ferrocenium ion.

In the above-mentioned formula (V), Y is an anionic component of the ionic compound and it is the component which will be the stable anion when reacted with the reaction product of the halogenated metallocene compound and the organometallic compound. Examples of Y include the anionic components of ionic compounds such as an ionic organoboron, organoaluminum, organogallium, organophosphorus, organoarsenic and organoantimony. Typical examples of Y and the ionic compounds include tetraphenylboron, tetrakis(3,4,5-trifluorophenyl)boron, tetrakis(3,5-di(trifluoromethyl)phenyl)boron, tetrakis(3,5-di(t-butyl)phenyl)boron, tetrakis(pentafluorophenyl)boron, tetraphenylaluminum, tetrakis(3,4,5-trifluorophenyl) aluminum, tetrakis(3,5-di(trifluoromethyl)phenyl) aluminum, tetrakis(3,5-di(t-butyl)phenyl)aluminum, tetrakis (pentafluorophenyl)aluminum, tetraphenylgallium, tetrakis (3,4,5-trifluorophenyl)gallium, tetrakis(3,5-di (trifluoromethyl)phenyl)gallium, tetrakis(3,5-di(t-butyl) phenyl)gallium, tetrakis(pentafluorophenyl)gallium, tetraphenylphosphorus, tetrakis(pentafluorophenyl)

phosphorus, tetraphenylarsenic, tetrakis(pentafluorophenyl) arsenic, tetraphenylantimony, tetrakis(pentafluorophenyl) antimony, decaborate, undecaborate, carbadodecaborate and decachlorodecaborate.

The electrophilic compound is a compound which is known as a Lewis acid compound and which will constitute a polymerization active species by forming a stable anion when reacted with the reaction product of the halogenated metallocene compound and the organometallic compound. Examples of the electrophilic compound include various halogenated metallic compounds and metallic oxides known as solid acids. Typical examples of the electrophilic compound include magnesium halides and inorganic oxides having Lewis acidity.

Examples of the magnesium halides which can be used in the present invention include magnesium compounds having at least one halogen atom in each molecule, for example, magnesium chloride, magnesium bromide, magnesium iodide, magnesium chlorobromide, magnesium chloroiodide, magnesium bromoiodide, magnesium chloride hydride, magnesium chloride hydroxide, magnesium bromide hydroxide, magnesium chloride alkoxide and magnesium bromide alkoxide.

The usable magnesium halide has a surface area of from 1 to 300 m$^2$/g, and in general, the commercially available magnesium halides having a surface area of from 1 to 25 m$^2$/g can also be used directly. It is more preferable that the magnesium halide is treated by grinding or the like so that the surface area thereof may be from 30 to 300 m$^2$/g. Here, "the surface area" means a specific surface area measured by utilizing nitrogen molecules as adsorptive molecules in accordance with a BET multi-point process by the use of a high-speed specific surface area/pore distribution measuring device ASAP-2000 made by Shimadzu Seisakusho Ltd.

The magnesium halide compound having a surface area of from 30 to 300 m$^2$/g can be obtained by further grinding the usually commercially available product having a surface area of 25 m$^2$/g or less or by once dissolving the commercial product and precipitating it again. Furthermore, the magnesium halide can be also synthesized by adding a halogenating agent to an organomagnesium compound. This typical synthesis can be achieved only by adding, to the solution of the organomagnesium compound, a halogenating agent which is capable of forming a halogenated magnesium compound when reacted with the organomagnesium compound. Examples of the organomagnesium compound which can be here used include dialkylmagnesiums such as dimethylmagnesium, diethylmagnesium, dibutylmagnesium, dihexylmagnesium and butylethylmagnesium; diarylmagnesiums such as diphenylmagnesium and bistriphenyimethylmagnesium; and Grignard reagents such as methylmagnesium bromide, ethylmagnesium chloride, ethylmagnesium bromide, butylmagnesium chloride, butylmagnesium bromide, butylmagnesium iodide, phenylmagnesium chloride, phenylmagnesium bromide, cyclohexylmagnesium chloride, naphthylmagnesium bromide and styrylmagnesium bromide. Examples of the compound with which the above-mentioned organomagnesium compound is halogenated include organic halides such as carbon tetrachloride, chloroform, dichloromethane, carbon tetrabromide, iodoform, dibromomethane, isopropyl chloride, isobutyl chloride, benzyl chloride, triphenylmethyl chloride, isopropyl bromide, isobutyl iodide, benzyl bromide, triphenylmethyl iodide, benzal dichloride and benzo trichloride; inorganic halides such as hydrogen chloride, hydrogen bromide, hydrogen iodide, boron chloride, aluminum chloride, titanium chloride, vanadium chloride, silicon tetrachloride, phosphorus chloride and thionyl chloride; and halogens such as fluorine, chlorine, bromine and iodine.

In synthesizing the magnesium halide by adding the halogenating agent to the organomagnesium compound, an organomagnesium compound represented by the following formula (VI) may be reacted with an organoaluminum compound represented by the following formula (VII) as the halogenating agent in a polymerization vessel to produce the magnesium halide, i.e., the compound which will be the stable anion in situ, and the α-olefin can be then polymerized:

$$MgR^3R^4 \qquad (VI)$$

(wherein R$^3$ is a hydrocarbon residue having 1 to 20 carbon atoms, and R$^4$ is a hydrocarbon residue having 1 to 20 carbon atoms or a halogen atom), and

$$R^5R^6AlX \qquad (VII)$$

(wherein R$^5$ and R$^6$ may be identical or different and each of them is a hydrocarbon residue having 1 to 20 carbon atoms, an alkoxy group, a halogen atom, an oxygen atom or a hydrogen atom; and X is a halogen atom).

In this case, the organomagnesium compound and the organoaluminum compound can both be used as the organometallic compounds for treating the halogenated metallocene compound, and therefore when the halogenated metallocene compound is treated with the organomagnesium compound or the organoaluminum compound, the organometallic compound can be excessively used to react the organoaluminum compound or the organomagnesium compound with the excess organomagnesium compound or organoaluminum compound in situ, thereby producing the halogenated magnesium compound, i.e., the compound which will be the stable anion.

That is, an excess amount of the organomagnesium compound or the organoaluminum compound as the organometallic compound with which the halogenated metallocene compound is treated is introduced into the polymerization vessel, and the organoaluminum compound or the organomagnesium compound is further added thereto, whereby the halogenated magnesium can be produced in the polymerization vessel and thus the olefin can be polymerized.

As the inorganic oxide having Lewis acidity which can be used in the present invention, there can usually be used an inorganic oxide which is commercially available as a solid acid. Examples of the inorganic oxide include silica, alumina, silica-alumina and silica-magnesia. Above all, alumina and silica-magnesia are preferably used. The good inorganic oxides contain no water and have the largest possible surface area, and usually it is preferable to use the compound of a surface area of from 10 to 500 m$^2$/g. The particularly preferable compound is aluminum oxide having a surface area of from 15 to 500 m$^2$/g. These values of the surface area are what have been measured by the same manner as in the case of the halogenated magnesium compound. When the inorganic oxide having a surface area of 10 m$^2$/g or less is used, a sufficient activity cannot be obtained. It is difficult to obtain the compound having a surface area of 500 m$^2$/g or more, and even if the surface area is further increased, performance is not so effectively improved any more. Moreover, it is necessary that the inorganic oxide is beforehand dehydrated. As techniques for dehydrating the inorganic oxide, there are a process which comprises subjecting the oxide to a heat treatment at a temperature of from 200 to 1000° C., and another process which comprises additionally dehydrating the oxide with an organometallic compound after the heat treatment. Examples of the organometallic compound which can be used in the dehydration treatment include compounds of metals such as aluminum, zinc and magnesium. In the organometallic compound, a halogen atom, an oxygen atom, a hydrogen atom or a residue such as alkyl, alkoxy or aryl is bonded to a metallic atom, and in the case that the plural members of the latter atoms and residues are used, they may be identical or different, but at least one of them should be the alkyl group. For example, there can be utilized an alkylmetal compound having one or more alkyl residue of 1 to 12 carbon atoms, an alkylmetal halide, or an alkylmetal alkoxide having the above-mentioned alkyl residue and another atom or residue.

The amount of the compound which will form the above-mentioned stable anion is from 1 to 100 mols, preferably 1 to 10 mols per mol of a transition metal compound used in the catalyst in the case of the ionic compound; it is 1 to 10000 mols, preferably 1 to 5000 mols in the case of the halogenated magnesium compound; and it is 1 to 10000 mols, preferably 1 to 5000 mols in the case of the other electrophilic compound.

What is very important in the present invention is that the halogenated metallocene compound is first reacted with the organometallic compound and the resultant product is then brought into contact with the compound which will form the stable ion. If this order is wrong, an obtained catalyst system cannot cause the polymerization of the α-olefin at all, or even when the polymerization occurs, the activity of the catalyst system is very low, so that the reproducibility of the polymerization is poor. For example, as a technique which is utilized in the polymerization of the olefin by the use of a conventional Ziegler catalyst, there is a process in which a monomer or a solvent for use in the polymerization is treated with the organometallic compound, particularly an alkylaluminum compound in order to remove impurities contained in the monomer or the solvent therefrom, and this process is equal to the present invention in point of the employment of the alkylaluminum. With regard to the order of this conventional process, however, the metallocene compound is first brought into contact with the stable ion, and afterward the monomer and the solvent treated with the alkylaluminum are used. In this case, the alkylaluminum merely functions as a scavenger, and catalyst poisons are removed from the monomer and the solvent, with the result that the activity of the catalyst can be improved to some extent. However, this process is clearly different from that of the present invention, and thus the polymerization activity of the conventional catalyst is much lower than that of the catalyst system according to the present invention. Furthermore, in the case that the halogenated metallocene compound is replaced with an alkylated metallocene compound and the polymerization is carried out by the procedure of the present invention, the activity can be improved perceptibly, but this improved activity is still lower as compared with that of the present invention in which the halogenated metallocene compound is used. In a preferable embodiment of the present invention, the reaction product obtained by reacting the halogenated metallocene compound with the organometallic compound is brought into contact with the α-olefin, prior to coming in contact with the compound which will be the stable anion. If the catalyst system which has been brought into contact with the α-olefin and then into contact with the compound which will be the stable anion is utilized, the polymerization makes smooth progress and the polymerization activity is also improved.

When the reaction product obtained by reacting the halogenated metallocene compound with the organometallic compound is brought into contact with the compound which will be the stable anion, the compound which will be the stable anion can be divided into at least two portions and then added, instead of adding the total amount thereof at one time. This is also one embodiment of the present invention. That is, prior to the starting of the polymerization, a portion of the compound which will be the stable anion is added, so that the polymerization is allowed to start, and after a suitable period of time, the remaining amount of the compound is added during the polymerization, or alternatively the compound is successively added. This manner permits performing the polymerization stably for a long period of time.

For the purposes of enlarging the bulk density of the obtained polymer, improving the properties of the polymer powder and preventing the polymer from adhering to the polymerization vessel, the present invention suggests a polymerization method using a solid catalyst component in which the reaction product obtained by treating the halogenated metallocene compound with the organoaluminum compound is supported on a carrier. In this case, the contact treatment with the compound which will be the stable anion can be carried out under polymerization conditions or prior to the polymerization.

For the same purposes, a solid catalyst can be used in which the reaction product obtained by treating the halogenated metallodene compound with the organometallic compound and the compound which will be the stable anion are both supported on a carrier. In this case, these compounds are required to be supported on the carrier which has been beforehand treated with the organometallic compound.

Examples of the carrier compound which can be used in the present invention include inorganic oxides such as silica, alumina, silica-alumina, magnesia, silica-magnesia, boron oxide, titania and zirconia; various metallic salts such as inorganic halides, inorganic hydroxides, carbonates and perchlorates; and composites thereof. In addition, high-molecular compounds of a fine grain state which are organic compounds can also be used. The carrier compound, since preferably anhydrous, is required to be beforehand dried, if it is not what is industrially obtained. The drying of the carrier compound can usually be achieved by thermally treating the same in vacuo or under a dried inert gas at 100–1000° C., preferably 200–800° C. for a predetermined period of time.

The size of the carrier compound which can be preferably utilized is usually such that its diameter is from about 1 μm to 0.1 mm.

No particular restriction is put on a process for carrying, on the carrier, the reaction product obtained by treating the halogenated metallocene compound with the organoaluminum, and the carrying process can be achieved by bringing the treated reaction product into contact with the carrier compound in a solvent or a solid phase. In the case that the they are contacted in a solvent, the carrier compound is first suspended in an inert solvent such as a hydrocarbon solvent, and the organometallic compound is then added thereto, followed by stirring. Examples of the solvent which can be used in this treatment include saturated hydrocarbon compounds such as propane, pentane, hexane, heptane, octane, nonane, decane, cyclopentane and cyclohexane; aromatic hydrocarbon compounds such as benzene, toluene and xylene; ether compounds such as diethyl ether and tetrahydrofuran; and ester compounds. In addition, in the case the above-mentioned contact is carried out in the solid phase, the reaction product and the carrier compound are ground together. No particular restriction is put on the grinding manner, and the usual grinding technique using a ball mill, a vibration mill or the like can be directly employed. At this time, a grinding auxilliary can be used together, so long as it does not decompose the catalyst component under the grinding conditions.

In the case that the reaction product obtained by treating the halogenated metallocene compound with the organometallic compound as well as the compound which will be the stable anion are both carried on the carrier, the carrier compound is required to be beforehand treated with the organometallic compound. No particular restriction is put on the manner of treating the carrier compound with the organometallic compound, and the treatment can be achieved by bringing the carrier compound into contact with the organometallic compound in a liquid phase or a solid phase. That is, the carrier compound is first suspended in an inert solvent such as a hydrocarbon compound, and the halogenated metallocene compound which has been treated with the organometallic compound is added to the suspension, followed by stirring, or alternatively both the components are ground together by the use of a mill such as a ball mill or a vibration mill.

An example of the organometallic compound with which the carrier compound is treated has a metallic atom in the group I, II, XII or XIII of the periodic table, above all, preferably aluminum, zinc or magnesium to which a halogen atom, an oxygen atom, a hydrogen atom or a residue such as alkyl, alkoxy or aryl is bonded. In the case that the plural members of the latter atoms and residues are used, they may be identical or different, but at least one of them should be the alkyl group. Typical examples of the organometallic compound include an alkylmetal compound having one or more of the alkyl residues of 1 to 12 carbon atoms, an alkylmetal halide and an alkylmetal alkoxide having the above-mentioned alkyl residue and another atom or residue. Preferable examples of the organometallic compound in which the metallic atom is aluminum are as follows:

Trimethylaluminum, triethylaluminum, tripropylaluminum, triisopropylaluminum, tributylaluminum, triisobutylaluminum, tripentylaluminum, trihexylaluminum, triheptylaluminum, trioctylaluminum, tridecylaluminum, isoprenylaluminum, diethylaluminum hydride, diisopropylaluminum hydride, diisobutylaluminum hydride, diethylaluminum chloride, dipropylaluminum chloride, diisopropylaluminum chloride, diisobutylaluminum chloride, diethylaluminum ethoxide, diisopropylaluminum isopropoxide, ethylaluminum sesquichloride, isopropylaluminum sesquichloride, isobutylaluminum sesquichloride, ethylaluminum dichloride, isopropylaluminum dichloride, isobutylaluminum dichloride and ethylaluminum diisopropoxide. Preferable examples of the organometallic compound in which the metallic atom is zinc include diethylzinc, diphenylzinc and divinylzinc. Preferable examples of the organometallic compound in which the metallic atom is magnesium include alkylmagnesium halides such as methylmagnesium chloride, methylmagnesium bromide, ethylmagnesium chloride, propylmagnesium chloride and butylmagnesium chloride; and dialkylmagnesium such as dimethylmagnesium, diethylmagnesium, dibutylmagnesium, dihexylmagnesium and butylethylmagnesium.

In the case that the polymerization is carried out using this kind of carrier catalyst, it is also preferable to further use the organometallic compound together.

Furthermore, the compound which will be the stable anion may be beforehand brought into contact with a magnesium compound to form a solid catalyst component containing both the materials. Here, any magnesium compound can be used, so long as it does not react and inactivate the compound which will be the stable anion. Examples of the magnesium compound include salts such as magnesium chloride, magnesium bromide, magnesium iodide, magnesium oxide, magnesium perchlorate, magnesium hydroxide, magnesium carbonate and magnesium hydride; composite salts thereof; and composite materials with metallic oxides such as silica, alumina and titania. The preferable size of these compounds is such that its diameter is from about 1 μm to about 0.1 mm.

The magnesium compound in the present invention is preferably anhydrous, and it can be calcined prior to the contact with the compound which will be the stable anion, whereby at least free water may be preferably removed. No particular restriction is put on the manner of bringing the magnesium compound into contact with the compound which will be the stable anion to form a solid catalyst component, and the contact can be achieved in a solvent or a solid phase.

The manner of contacting them in the solvent comprises suspending the magnesium compound in an inert solvent such as a hydrocarbon solvent, and then adding the compound which will be the stable anion thereto, followed by stirring.

The contact manner in the solid phase comprises grinding the materials together. No particular restriction is put on the grinding way, and a usual way using a ball mill or a vibration mill can be directly employed. A grinding auxilliary such as an organic compound can be used together, so long as it does not decompose the catalyst component under the grinding conditions. Moreover, the together ground materials can be treated with a solvent. No particular restriction is put on a temperature in the grinding operation, but the grinding is usually carried out in the range of from −100 to 100° C., usually at a temperature in the vicinity of ordinary temperature.

In using the solid catalyst supported on the carrier in the polymerization of the α-olefin of the present invention, it is preferred that the organometallic compound is additionally used, since the organometallic compound functions to remove impurities from the reaction solvent and the monomer. Examples of the organometallic compound are the same as used in the treatment of the halogenated metallocene compound.

In the present invention, when the polymerization of the α-olefin is carried out in the presence of an internal olefin, the molecular weight of the resultant polyolefin can be controlled. The internal olefin is preferably an unsaturated hydrocarbon having 4 to 20 carbon atoms represented by the following formula (VIII), (IX) or (X):

(wherein each of $R^7$ and $R^8$ is an alkyl hydrocarbon residue having 1 to 17 carbon atoms, and $R^7$ and $R^8$ may be bonded to each other to form a ring),

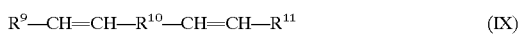

(wherein each of $R^9$ and $R^{11}$ is an alkyl hydrocarbon residue having 1 to 14 carbon atoms, and both may be bonded to each other to form a ring; and $R^{10}$ is an alkylene hydrocarbon residue having 1 to 14 carbon atoms), and

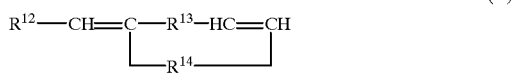

(wherein each of $R^{13}$ and $R^{14}$ is an alkylene hydrocarbon residue having 1 to 14 carbon atoms; and $R^{12}$ is an alkyl hydrocarbon residue having 1 to 14 carbon atoms).

Typical examples of the internal olefin include straight-chain internal olefins such as 2-butene, 2-pentene and 2-hexene; cyclic olefins such as cyclopentene, cyclohexene, cycloheptene and norbornene; and dienes such as 5-methylene-2-norbornene and 5-ethylidene norbornene. The amount of the internal olefin to be used depends upon the desired molecular weight of the polyolefin, but usually it is from 1/100000 to 1/10 of the monomer. When the molecular weight of the internal olefin is less than the above-mentioned range, the control of the molecular weight is not effective, and when it is larger than the above-mentioned range, the polymerization activity deteriorates noticeably, which is not practical.

Examples of the solvent which can be utilized in the preparation of the catalyst by the use of the catalyst component, the polymerization or the treatment include saturated hydrocarbons such as propane, butane, isobutane, pentane, hexane, heptane, octane, nonane, decane, cyclopentane, cyclohexane, cycloheptane and methylcyclohexane; aromatic hydrocarbon compounds such as benzene, toluene and xylene; and halogenated hydrocarbon compounds such as methylene chloride and chlorobenzene. In addition, ethers such as anisole and dimethylaniline as well as amines, nitriles and ester compounds having no active hydrogen can also be used as the solvents, so long as they neither link with nor strongly coordinate to a transition metal cation compound formed and inactivate its polymerization activity.

No particular restriction is put on conditions for the α-olefin polymerization by the use of the catalyst component, and there can be utilized a solvent polymerization method using an inert medium, a mass polymerization method in which no inert medium is substantially present and a gaseous phase polymerization method. Examples of the α-olefin which can be used in the polymerization include olefins having 2 to 25 carbon atoms, and typical examples thereof include straight-chain α-olefins such as ethylene, propylene, butene-1, pentene-1, hexene-1, heptene-1, octene-1, nonene-1, decene-1, undecene-1, dodecene-1, tridecene-1, tetradecene-1, pentadecene-1, hexadecene-1 and octadecene-1; branched α-olefins such as 3-methylbutene-1, 4-methylpentene-1 and 4,4-dimethylpentene-1; and cyclic olefins such as cyclopentene, cyclooctene and norbornene. These α-olefins can be homopolymerized or mutually copolymerized, or if necessary, they can be copolymerized with a diene.

As a polymerization temperature and a polymerization pressure, there can be used such usual conditions as utilized in known methods, and the polymerization temperature is from −20 to 150° C., and the polymerization pressure is from the atmospheric pressure to 100 kg/cm$^2$G.

Now, the present invention will be described in more detail in reference to examples.

EXAMPLE 1

Figure 2B:
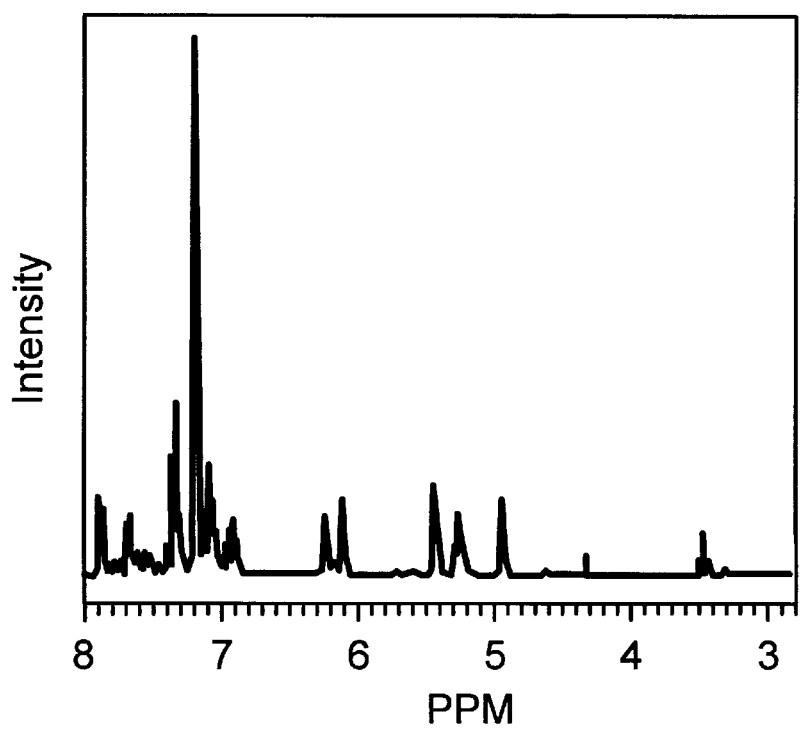

10 mg of isopropyl(cyclopentadienyl-1-fluorenyl) zirconium dichloride was dissolved in 3 ml of deuterated benzene at room temperature, and 1 ml of the resultant solution was placed in an NMR tube and proton NMR was then measured. The measured results are shown in FIG. 1. Furthermore, 1 ml of the solution was poured into another NMR tube, and 4 mols of triethylaluminum per mol of zirconium was added thereto and proton NMR was then measured. FIG. 2 shows a spectrum of the proton NMR measured 10 minutes after the mixing. In the spectrum, the absorption of the original halogenated metallocene compound substantially disappeared, and a new absorption came out instead.

Figure 3:
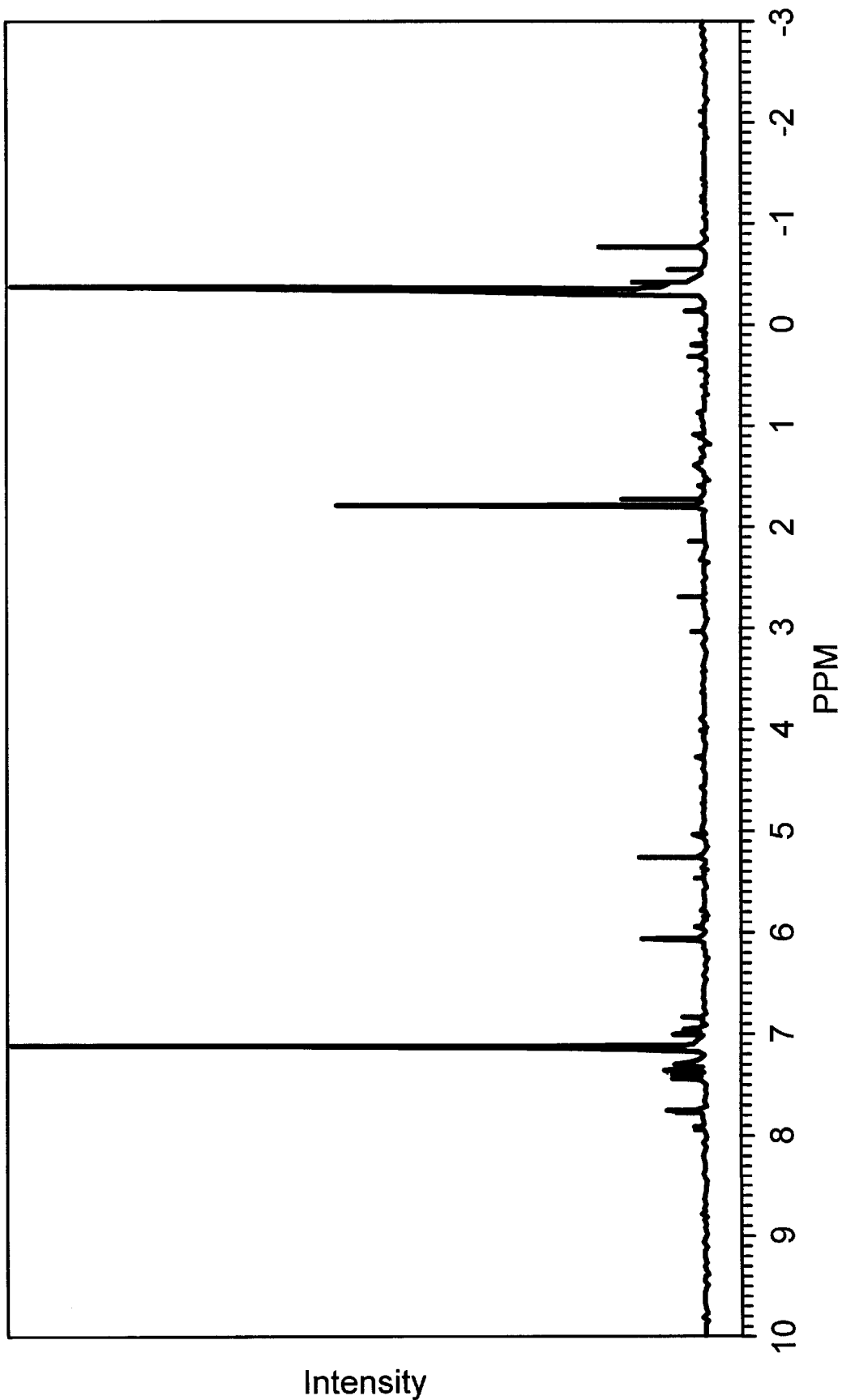
FIG. 3 shows a proton NMR spectrum measured 10 minutes after isopropyl(cyclopentadienyl-1-fluorenyl)-zirconium dichloride was mixed with trimethylaluminum.
Figure 4:
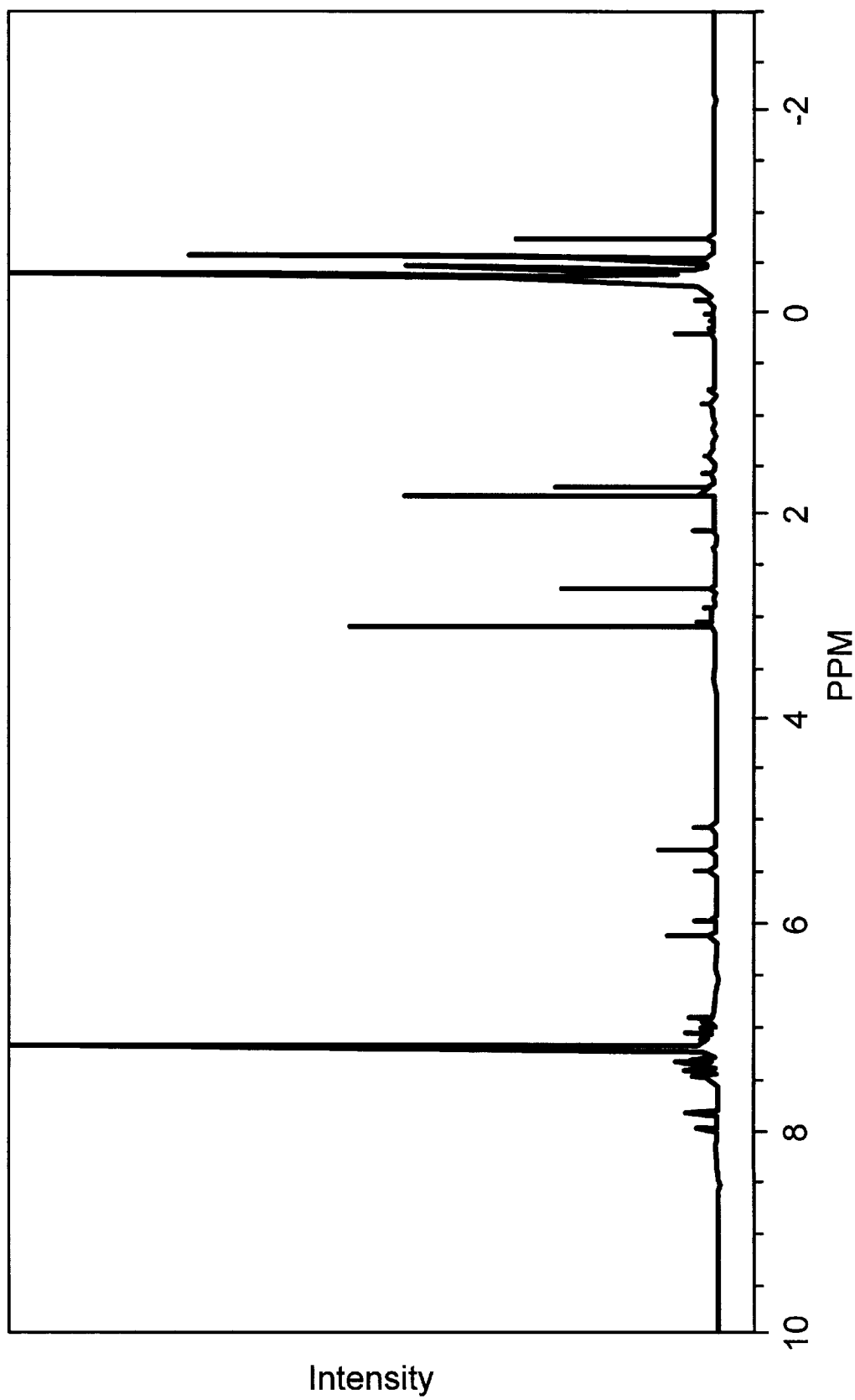
FIG. 4 shows a proton NMR spectrum measured after isopropyl(cyclopentadienyl-1-fluorenyl)zirconium dichloride was mixed with trimethylaluminum and the resultant mixture was then allowed to stand for 240 hours.

On the other hand, 10 mols of trimethylaluminum per mol of zirconium was added to 1 ml of the remaining solution. FIG. 3 is a spectrum of proton NMR measured 10 minutes after the mixing. The absorption of the original halogenated metallocene compound clearly remains, and it is apparent that most of the metallocene compound remains unreacted. This mixture with trimethylaluminum was stored at room temperature for 240 hours, and the proton NMR was measured again. The results are shown in FIG. 4, but it is apparent that most of the halogenated metallocene compound remains unreacted even when the mixture was allowed to stand for a long period of time.

One liter of toluene was introduced into a 2-liter autoclave, and propylene was added until pressure has reached 3 kg/cm$^2$G.

2 mg of isopropyl(cyclopentadienyl-1-fluorenyl) zirconium dichloride was dissolved in 10 ml of toluene, and 43 mg of triethylaluminum was added thereto so that the amount of an aluminum atom might be 80 mols per mol of a zirconium atom, followed by mixing. After one minute had passed, 12.8 mg of triphenylmethanetetra (pentafluorophenyl)boron was added so that the amount of a boron atom might be 3 mols per mol of a zirconium atom, thereby forming a catalyst. Immediately, this catalyst was introduced into the above-mentioned autoclave and then stirred 20° C. for 2 hours while a propylene pressure was maintained at 3. kg/cm$^2$G. The contents were filtered and dried to obtain 91.8 g of a polymer. The amount of the thus produced polypropylene per gram of zirconium in the catalyst was 218 kg. According to 13C-NMR, the syndiotactic pentad fraction of the polymer was 0.88, and the intrinsic viscosity (hereinafter referred to as "η") of the polymer measured in a tetralin solution at 135° C. was 1.14. The ratio of the weight average molecular weight to the number average molecular weight (hereinafter referred to as "MW/MN") of the polymer which was measured in 1,2,4-trichlorobenzene was 1.9.

COMPARATIVE EXAMPLE 1

FIG. 5 shows the proton NMR of isopropyl (cyclopentadienyl-1-fluorenyl)zirconiumdimethyl complex obtained by methylating isopropyl(cyclopentadienyl-1-fluorenyl)zirconium dichloride with methyllithium.

The polymerization of propylene was carried out by the same procedure as in Example 1 except that isopropyl (cyclopentadienyl-1-fluorenyl)zirconium dichloride was replaced with 2 mg of the above-mentioned dimethyl complex. Afterward, the contents were filtered and then dried at 60° C. under 70 mmHg abs. for 8 hours to obtain 69 g of a white polypropylene powder. The amount of the produced polypropylene per gram of zirconium in the catalyst was 164 kg. The syndiotactic pentad fraction of the obtained polymer was 0.88, η was 1.13, and MW/MN was 2.2.

COMPARATIVE EXAMPLE 2

The polymerization of propylene was carried out by the same procedure as in Example 1 except that no triethylaluminum was used, but a polymer was not obtained at all.

COMPARATIVE EXAMPLE 3

A solution prepared by dissolving 2 mg of isopropyl (cyclopentadienyl-1-fluorenyl)zirconium dichloride in 10 ml of toluene was added to another solution prepared by dissolving 12.8 mg of triphenylmethanetetra (pentafluorophenyl)boron in 10 ml of toluene to form a catalyst component solution.

One liter of toluene was placed in a 2-liter autoclave, and 43 mg of triethylaluminum was added thereto. Next, propylene was added until the pressure in the autoclave had reached 3 kg/cm$^2$G, and after the temperature of the solution had been elevated up to 20° C., the above-mentioned catalyst component solution was added to the autoclave to start polymerization. Afterward, the polymerization of propylene was carried out by the same procedure as in Example 1, so that 0.8 g of a polymer was merely obtained.

COMPARATIVE EXAMPLE 4

12.8 mg of triphenylmethanetetra(pentafluorophenyl) boron dissolved in 10 ml of toluene was added to a 2-liter autoclave containing 1 liter of toluene, and 43 mg of triethylaluminum was further added thereto. Next, propylene was added until pressure has reached 3 kg/cm$^2$G, and after the temperature of the solution had been elevated up to 20° C., a solution prepared by dissolving 2 mg of isopropyl (cyclopentadienyl-1-fluorenyl)zirconium dichloride in 10 ml of toluene was added to the autoclave to start polymerization. Afterward, the polymerization of propylene was carried out by the same procedure as in Example 1, but a polymer was not obtained at all.

EXAMPLE 2

The polymerization of propylene was carried out by the same procedure as in Example 1 except that 2 mg of isopropyl(cyclopentadienyl-1-fluorenyl)zirconium dichloride and 43 mg of triethylaluminum were replaced with 10 mg of ethylenebis(tetrahydroindenyl)zirconium dichloride and 220 mg of triethylaluminum so that the amount of aluminum atom might be 80 mols per mol of the zirconium atom, thereby obtaining 60 g of a polymer. The amount of the produced polypropylene per gram of zirconium in the catalyst was 28.5 kg. The isotactic pentad fraction of the obtained polymer was 0.89, η was 0.72, and MW/MN was 2.3.

EXAMPLE 3

The polymerization of propylene was effected by the same procedure as in Example 1 except that 43 mg of triethylaluminum was replaced with 75 mg of triisobutylaluminum so that the amount of an aluminum atom might be 80 mols per mol of a zirconium atom, thereby obtaining 105 g of a polymer. In the obtained polymer, η was 1.18, an isotactic pentad fraction was 0.88, and MW/MN was 2.3.

EXAMPLE 4

The polymerization of propylene was effected by the same procedure as in Example 1 except that 12.8 mg of triphenylmethanetetra(pentafluorophenyl)boron was replaced with 25 mg of tri(pentafluorophenyl)boron (the amount of a boron atom was 9 mols per mol of a zirconium atom), thereby obtaining 56 g of a polymer. In the obtained polymer, η was 1.12, a syndiotactic pentad fraction was 0.86, and MW/MN was 2.3.

EXAMPLE 5

The polymerization of propylene was carried out by the same procedure as in Example 1 except that 43 mg of triethylaluminum was replaced with 28 mg of trimethylaluminum so that the amount of an aluminum atom might be 80 mols per mol of a zirconium atom, thereby only obtaining 1.8 g of a polymer. In the obtained polymer, η was 1.12, a syndiotactic pentad fraction was 0.87, and MW/MN was 2.2.

EXAMPLE 6

20 g of anhydrous magnesium chloride (made by Toho Titanium Co., Ltd., surface area 9 m$^2$/g), 3.5 g of triphenylmethanetetra(pentafluorophenyl)boron and 4 ml of toluene were placed in a vibration mill (in which there was used a 1-liter grinding pot containing 300 steel balls having a diameter of 12 mm), followed by grinding for 17 hours. On the other hand, 4 mg of isopropyl(cyclopentadienyl-1-fluorenyl)zirconium dichloride was dissolved in 10 ml of toluene, and 425 mg of triethylaluminum was added thereto so that the ratio of an aluminum atom to a zirconium atom might be 400, followed by mixing. The total amount of the resultant mixture solution and 592 mg of the above-mentioned ground material [which corresponded to 80 mg of triphenylmethanetetra(pentafluorophenyl)boron (the amount of a boron atom was 9.3 mols per mol of the zirconium atom)] were sufficiently dried and then placed under a nitrogen gas stream in a 5-liter autoclave in which the atmosphere was replaced with nitrogen. In addition, 1.5 kg of liquid propylene was added, and polymerization was carried out at 60° C. for 1 hour. Unreacted propylene was purged from the system, and the contents were taken out and then dried to obtain 293 g of a polymer (which corresponded to 384 kg of polypropylene per gram of zirconium). According to 13C-NMR, a syndiotactic pentad fraction was 0.80, η was 0.88, and MW/MN was 5.0.

EXAMPLE 7

The polymerization of propylene was carried out by the same procedure as in Example 6 except that there was used a ground material obtained by replacing 3.5 g of triphenylmethanetetra(pentafluorophenyl)boron with 7 g of tri(pentafluorophenyl)boron (the amount of a boron atom was 30 mols per mol of a zirconium atom), thereby obtaining 123 g of a polymer. In the obtained polymer, η was 0.78, a syndiotactic pentad fraction was 0.80, and MW/MN was 3.0.

EXAMPLE 8

The polymerization of propylene was carried out by the same procedure as in Example 6 except that 4.0 mg of isopropyl(cyclopentadienyl-1-fluorenyl)zirconium dichloride was replaced with 4.0 mg of ethylenebis (tetrahydroindenyl)zirconium dichloride, thereby obtaining 246 g of a polymer. In the obtained polymer, an isotactic pentad fraction was 0.80, η was 0.50, and MW/MN was 2.8.

EXAMPLE 9

The polymerization of propylene was carried out by the same procedure as in Example 6 except that 425 mg of triethylaluminum was replaced with 740 mg of triisobutylaluminum so that the amount of an aluminum atom might be 400 mols per mol of a zirconium atom, thereby obtaining 351 g of a powder. In this powder, η was 0.88, a syndiotactic pentad fraction was 0.81, and MW/MN was 3.5.

EXAMPLE 10

A mixture of 10 g of anhydrous magnesium chloride (made by Toho Titanium Co., Ltd., surface area 9 m$^2$/g) and 1.9 ml of a toluene solution containing 0.38 g of triethylaluminum was placed in a vibration mill (in which there was used a 1-liter grinding pot containing 300 steel balls having a diameter of 12 mm), followed by grinding for 17 hours. Furthermore, 2.2 g of triphenylmethanetetra (pentafluorophenyl)boron and a solution prepared by dissolving 0.4 g of isopropyl(cyclopentadienyl-1-fluorenyl) zirconium dichloride in 2 g of a 20 weight % toluene solution of triethylaluminum (which corresponded to 0.4 g of triethylaluminum) were added to the vibration mill, followed by grinding for 4 hours. 200 mg of the ground material (which corresponded to 27 mg of triphenylmethanetetra(pentafluorophenyl)boron and 5.0 mg of isopropyl(cyclopentadienyl-1-fluorenyl)zirconium dichloride) and 230 mg of triethylaluminum were placed in a 5-liter autoclave. In addition, 1.5 kg of liquid propylene was added, and polymerization was then carried out at 60° C. for 2 hours. Unreacted propylene was purged from the system, and the contents were taken out and then dried to obtain 265 g of a polymer (which corresponded to 252 kg of polypropylene per gram of zirconium). According to 13C-NMR, a syndiotactic pentad fraction was 0.80, η was 0.79, and MW/MN was 2.5.

EXAMPLE 11

The same procedure as in Example 10 was effected except that 2.2 g of triphenylmethanetetra(pentafluorophenyl)boron was replaced with 2.4 g of tri(pentafluorophenyl)boron, to synthesize a solid catalyst. The polymerization of propylene was then carried out using 200 mg of this solid catalyst [which corresponded to 29 mg of tri(pentafluorophenyl) boron and 5.0 mg of isopropyl(cyclopentadienyl-1-fluorenyl)zirconium dichloride] and 230 mg of triethylaluminum, thereby obtaining 108 g of a powder. In this powder, η was 0.79, a syndiotactic pentad fraction was 0.78, and MW/MN was 2.7. In addition, bulk specific gravity was 0.30 g/ml, and the adhesion of the polymer to the wall of the polymerizer was slight.

EXAMPLE 12

The same procedure as in Example 10 was effected except that 0.4 g of isopropyl(cyclopentadienyl-1-fluorenyl) zirconium dichloride was replaced with 0.4 g of ethylenebis (tetrahydroindenyl)zirconium dichloride, to synthesize a solid catalyst. The polymerization of propylene was then carried out using 200 mg of this solid catalyst [which corresponded to 27 mg of triphenylmethanetetra (pentafluorophenyl)boron and 5.0 mg of ethylenebis (tetrahydroindenyl)zirconium dichloride] and 230 mg of triethylaluminum, thereby obtaining 215 g of a powder. In this powder, η was 0.49, an isotactic pentad fraction was 0.81, and MW/MN was 3.5. In addition, bulk specific gravity was 0.31 g/ml, and the adhesion of the polymer to the wall of the polymerizer was slight.

EXAMPLE 13

The polymerization of propylene was carried out by the same procedure as in Example 6 except that triethylaluminum was replaced with triisobutylaluminum so that the molar ratio of aluminum to zirconium might be unchanged, thereby obtaining 308 g of a powder. In this powder, η was 0.80, a syndiotactic pentad fraction was 0.81, and MW/MN was 2.5. In addition, bulk specific gravity was 0.32 g/ml, and the adhesion of the polymer to the wall of the polymerizer was slight.

EXAMPLE 14

50 g of γ-alumina which had been treated at 600° C. under reduced pressure for 6 hours was placed in a 2000-ml four-necked flask in which the atmosphere had been replaced with nitrogen, and 1000 ml of toluene was further added thereto. In addition, 25 ml of a toluene solution containing 5.0 g of trimethylaluminum was added dropwise, while the contents were stirred. After the stirring at room temperature for 17 hours, the treated alumina was filtered through a glass filter, washed with 50 ml of pentane three times, and then dried under reduced pressure. Afterward, 10 g of γ-alumina which had been treated with trimethylaluminum was placed in a 2000-ml four-necked flask in which the atmosphere had been replaced with nitrogen, and 100 ml of toluene was further added thereto. Afterward, 2.2 g of triphenylmethanetetra(pentafluorophenyl)boron and a solution prepared by dissolving 0.2 g of isopropyl (cyclopentadienyl-1-fluorenyl)zirconium dichloride in 2 g of a 20 wt.% triethylaluminum solution in toluene (which corresponded to 0.4 g of triethylaluminum) were added dropwise, while the contents were stirred. After stirring at room temperature for 1 hour, the solvent was distilled off under reduced pressure, and the residue was washed with 50 ml of pentane three times and then dried under reduced pressure. 200 mg of this treated material (which corresponded to 34 mg of triphenylmethanetetra (pentafluorophenyl)boron and 3.1 mg of isopropyl (cyclopentadienyl-1-fluorenyl)zirconium dichloride) and 230 mg of triethylaluminum were placed in a 5-liter autoclave. In addition, 1.5 kg of liquid propylene was added, and polymerization was then carried out at 60° C. for 2 hours. Unreacted propylene was purged from the system, and the contents were taken out and then dried to obtain 220 g of a polymer (which corresponded to 337 kg of polypropylene per gram of zirconium). According to 13C-NMR, a syndiotactic pentad fraction was 0.80, η was 0.79, and MW/MN was 2.6. In addition, bulk specific gravity was 0.32 g/ml, and the adhesion of the polymer to the wall of the polymerizer was slight.

EXAMPLE 15

1.5 mg of isopropyl(cyclopentadienyl-1-fluorenyl) zirconium dichloride was dissolved in 10 ml of toluene, and 78 mg of triethylaluminum was added thereto, thereby forming a catalyst. Next, 1 liter of toluene was added to a 2-liter autoclave, and the above-mentioned catalyst was then introduced thereinto. Propylene was further added so that the pressure might be 3 kg/cm²G at 20° C., and a solution prepared by dissolving 6.42 mg of triphenylmethanetetra (pentafluorophenyl)boron in 10 ml of toluene was added with the aid of a propylene gas under pressure, and polymerization was then carried out at 20° C. while a pressure of 3 kg/cm²G was maintained. After the polymerization had been done for 60 minutes, a solution prepared by dissolving 6.42 mg of triphenylmethanetetra(pentafluorophenyl)boron in 10 ml of toluene was introduced thereinto with the aid of a propylene gas under pressure, and the polymerization was then carried out for 60 minutes. In this polymerization, any vigorous reaction was not observed, and temperature was controlled easily. Next, filtration and drying followed to obtain 121 g of a polymer (which corresponded to 382 kg of polypropylene per gram of zirconium). According to 13C-NMR, a syndiotactic pentad fraction was 0.88, η was 1.21, and MW/MN was 2.2.

EXAMPLE 16

The polymerization of propylene was carried out by the same procedure as in Example 15 except that the total amount of 12.8 mg of triphenylmethanetetra (pentafluorophenyl)boron at an early stage in Example 15 was added at one time and the same compound was not added any more. In this case, immediately after triphenylmethanetetra(pentafluorophenyl)boron had been added, vigorous reaction occurred, but after the polymerization had been carried out for 60 minutes, the absorption of propylene was scarcely observed. The polymerization was further continued for 60 minutes, and filtration and drying followed to obtain 93.7 g of a polymer (which corresponded to 296 kg of polypropylene per gram of zirconium). According to 13C-NMR, a syndiotactic pentad fraction was 0.87, η was 1.16, and MW/MN was 2.1.

EXAMPLE 17

Polymerization was carried out by the same procedure as in Example 15 except that 2 mg of isopropyl (cyclopentadienyl-1-fluorenyl)zirconium dichloride and 78 mg of triethylaluminum were used and that a solution prepared by dissolving 10.7 mg of triphenylmethanetetra (pentafluorophenyl)boron in 40 ml of toluene was used as much as the amount of ¼ thereof at an early stage and after the start of the polymerization, the solution was used in an amount of ¼ thereof every 30 minutes. In this polymerization, any vigorous reaction was not observed, the absorption of propylene was constant. After the polymerization had been done for 2 hours, filtration and drying followed to obtain 129 g of a polymer (which corresponded to 306 kg of polypropylene per gram of zirconium). According to 13C-NMR, a syndiotactic pentad fraction was 0.90, η was 1.10, and MW/MN was 2.3.

EXAMPLE 18

Polymerization was carried out by the same procedure as in Example 15 except that in place of triphenylmethanetetra (pentafluorophenyl)boron, tri(pentafluorophenyl)boron was used in an amount of 10 mg at an early stage and in an amount of 15 mg after 60 minutes. After the polymerization, filtration and drying followed to obtain 61 g of a powder (which corresponded to 193 kg of polypropylene per gram of zirconium). In the powder, η was 1.15, a syndiotactic pentad fraction was 0.87, and MW/MN was 2.2.

EXAMPLE 19

10 mg of isopropyl(cyclopentadienyl-1-fluorenyl) zirconium dichloride was dissolved in 10 ml of toluene, and 215 mg of triethylaluminum was added thereto so that the amount of an aluminum atom might be 80 mols per mol of a zirconium atom, followed by mixing. Afterward, ⅕ of the resultant mixture as a catalyst was placed in a 2-liter autoclave containing 1 liter of toluene. Next, propylene was added so that the pressure might be 3 kg/cm²G, and a solution prepared by dissolving 9.7 mg of triphenylmethanetetra(pentafluorophenyl)boron in 10 ml of toluene was then added to the autoclave so that the amount of a boron atom might be 2.3 mols per mol of a zirconium atom. While the propylene pressure was maintained at 3 kg/cm²G, the contents were stirred at 20° C. for 2 hours. The contents were filtered and dried to obtain 159.6 g of a polymer. The amount of the produced polypropylene per gram of zirconium in the catalyst was 379 kg. According to 13C-NMR, a syndiotactic pentad fraction of the polymer was 0.89, η was 1.21, and MW/MN was 2.0.

Next, a toluene solution of the above-mentioned isopropyl (cyclopentadienyl-1-fluorenyl)zirconium dichloride and triethylaluminum was stored at room temperature for one month, and the polymerization of propylene was then carried out in like manner. After the polymerization, filtration and drying followed to obtain 161 g of a powder (which corresponded to 382 kg of polypropylene per gram of zirconium). In the powder, η was 1.20, a syndiotactic pentad fraction was 0.88, and MW/MN was 2.1. Even after the storage, the performance of the polymerization did not change.

COMPARATIVE EXAMPLE 5

10 mg of isopropyl(cyclopentadienyl-1-fluorenyl) zirconium dichloride was dissolved in 10 ml of toluene, and ⅕ of the resultant solution was taken out as a catalyst and 43 mg of triethylaluminum was then added to this solution so that the amount of an aluminum atom might be 80 mols per mol of a zirconium atom, followed by mixing. The resultant mixture was then placed in a 2-liter autoclave containing 1 liter of toluene. Next, propylene was added so that the pressure might be 3 kg/cm2G, and a solution prepared by dissolving 9.7 mg of triphenylmethanetetra (pentafluorophenyl)boron in 10 ml of toluene was added to the autoclave so that the amount of a boron atom might be 2.3 mols per mol of a zirconium atom. While the propylene pressure was maintained at 3 kg/cm²G, the contents were stirred at 20° C. for 2 hours. The contents were filtered and dried to obtain 159.6 g of a polymer. The amount of the produced polypropylene per gram of zirconium in the catalyst was 370 kg. According to 13C-NMR, a syndiotactic pentad fraction of the polymer was 0.88, η was 1.20, and MW/MN was 2.0.

Next, the above-mentioned toluene solution of isopropyl (cyclopentadienyl-1-fluorenyl)zirconium dichloride was stored at room temperature for one month, and the polymerization of propylene was then carried out in like manner. At this time, any polymerization activity could not be observed.

EXAMPLE 20

In place of isopropyl(cyclopentadienyl-1-fluorenyl) zirconium dichloride, 10 mg of ethylenebis (tetrahydroindenyl)zirconium dichloride was dissolved in 10 ml of toluene, and 215 mg of triethylaluminum was then added to the resultant mixture so that the amount of an aluminum atom might be 80 mols per mol of a zirconium atom, followed by mixing. ⅕ of this mixture as a catalyst was introduced into a 2-liter autoclave containing 1 liter of toluene. Next, propylene was added so that the pressure might be 3 kg/cm²G, and in place of 9.7 mg of triphenylmethanetetra(pentafluorophenyl)boron, a solution prepared by dissolving 550 mg of methylaluminoxane (made by Toso Akzo Co., Ltd., polymerization degree 16.1) in 10 ml of toluene was placed in the autoclave. While the propylene pressure was maintained at 3 kg/cm²G, the contents were stirred at 20° C. for 2 hours. The contents were filtered and dried to obtain 110 g of a polymer. The amount of the produced polypropylene per gram of zirconium in the catalyst was 258 kg. According to 13C-NMR, the polymer had an isotactic pentad fraction of 0.92, η of 0.70, and MW/MN of 2.2.

Next, the above-mentioned toluene solution of ethylenebis(tetrahydroindenyl)zirconium dichloride and triethylaluminum was stored at room temperature for one month, and the polymerization of propylene was then carried out in like manner. After the polymerization, filtration and drying followed to obtain 105 g of a powder (which corresponded to 249 kg of polypropylene per gram of zirconium). In the powder, η was 0.72, an isotactic pentad fraction was 0.91, and MW/MN was 2.2. Even after the storage, the performance of the polymerization did not change.

EXAMPLE 21

The same procedure as in Example 19 was effected except that in place of triethylaluminum, 375 mg of triisobutylaluminum was used so that the amount of an aluminum atom might be 80 mols per mol of a zirconium atom, thereby preparing a catalyst solution, and the polymerization of propylene was then carried out to obtain 193 g of a polymer. In the powder, η was 1.17, a syndiotactic pentad fraction was 0.88, and MW/MN was 2.1.

The above-mentioned toluene solution of isopropyl (cyclopentadienyl-1-fluorenyl)zirconium dichloride and triisobutylaluminum was stored at room temperature for one month, and the polymerization of propylene was then carried out in like manner. In this case, the activity of the polymerization scarcely changed.

EXAMPLE 22

The same procedure as in Example 19 was effected except that toluene was replaced with cyclohexane as a solvent to prepare a catalyst solution, and the polymerization of propylene was then carried out to obtain 70 g of a polymer. In the polymer, η was 1.41, a syndiotactic pentad fraction was 0.87, and MW/MN was 2.2. The above-mentioned cyclohexane solution of isopropyl(cyclopentadienyl-1-fluorenyl) zirconium dichloride and triethylaluminum was stored at room temperature for one month, and the polymerization of propylene was then carried out in like manner. In this case, the activity of the polymerization scarcely changed.

EXAMPLE 23

15 ml of a cyclohexane solution containing 6.64 g of triethylaluminum was added to 2.2 g of isopropyl (cyclopentadienyl-1-fluorenyl)zirconium dichloride. After the solution was stirred at room temperature for 24 hours, it was cooled to −78° C. and further allowed to stand for 24 hours. This solution was filtered through a glass filter to remove a small amount of insolubles, with the result that a uniform mixture solution was obtained.

5 g of γ-alumina which had been thermally treated at 600° C. for 6 hours under reduced pressure was placed in a 200-ml four-necked flask in which the atmosphere had been replaced with nitrogen, and 25 ml of toluene was further added and, while the contents were stirred, 5 ml of the above-mentioned reaction mixture solution was added dropwise thereto. After the stirring at room temperature for 24 hours, the treated alumina was filtered through a glass filter, washed with 50 ml of pentane three times, and then dried under reduced pressure. The soluble components which had not been carried on the Y-alumina were removed, and the remaining insolubles were further washed with 50 ml of pentane three times, and then dried under reduced pressure to obtain a solid catalyst component. 100 mg of this solid catalyst component [which corresponded to 3 mg of isopropyl(cyclopentadienyl-1-fluorenyl)zirconium dichloride], 80 mg of triphenylmethanetetra (pentafluorophenyl)boron and 400 mg of triethylaluminum were placed in a 5-liter autoclave whose interior had been sufficiently dried and replaced with nitrogen. Next, 1.5 kg of liquid propylene was added thereto, and the contents were heated up to 60° C. and polymerization was continued for one hour.

Unreacted propylene was purged from the system, and the contents were taken out and then dried at 60° C. under 700 mmHg for 8 hours to obtain 183 g of a powder (which corresponded to 290 kg of polypropylene per gram of zirconium). According to 13C-NMR, a syndiotactic pentad fraction was 0.80, η was 0.78, and MW/MN was 2.1. In addition, bulk specific gravity was 0.27 g/ml, and the adhesion of the polymer to the wall of the polymerizer was slight.

EXAMPLE 24

The same procedure as in Example 23 was effected except that isopropyl(cyclopentadienyl-1-fluorenyl)zirconium dichloride was replaced with 1.95 g of ethylenebis (tetrahydroindenyl)zirconium dichloride, to synthesize a solid catalyst component, and the polymerization of propylene was then carried out to obtain 98.8 g of a powder. According to 13C-NMR, an isotactic pentad fraction was 0.80, η was 0.40, and MW/MN was 2.3. In addition, bulk specific gravity was 0.24 g/ml, and the adhesion of the polymer to the wall of the polymerizer was slight.

EXAMPLE 25

The polymerization of propylene was carried out by the same procedure as in Example 23 except that in place of triethylaluminum, triisobutylaluminum was used so that the amount of an aluminum atom might be 80 mols per mol of a zirconium atom, thereby obtaining 195 g of a polymer. In the powder, η was 0.76, a syndiotactic pentad fraction was 0.81, and MW/MN was 2.6. In addition, bulk specific gravity was 0.24 g/ml, and the adhesion of the polymer to the wall of the polymerizer was slight.

EXAMPLE 26

40 mg of isopropyl(cyclopentadienyl-1-fluorenyl) zirconium dichloride was dissolved in 10 ml of toluene, and 0.86 g of triethylaluminum was further added thereto. 1 g of alumina (Aerosilaluminum Oxide-L, made by Nippon Aerosil Inc., surface area 95.8 m$^2$/g) which had been thermally treated at 1000° C. under reduced pressure was added thereto to form a catalyst. Next, under a nitrogen gas stream, the catalyst component was placed in a 5-liter autoclave which had been sufficiently dried and the atmosphere of which had been replaced with nitrogen, and 1.5 kg of liquid propylene was further added thereto. The contents were then heated up to 50° C. and polymerization was continued for 2 hours. Unreacted propylene was purged, and the contents were taken out and then dried at 60° C. under 70 mmHg for 8 hours to obtain 15 g of a white polypropylene powder (which corresponded to 1.8 kg of polypropylene per gram of zirconium). According to 13C-NMR, a syndiotactic pentad fraction was 0.73, η was 0.46, and MW/MN was 2.6.

EXAMPLE 27

The same alumina as used in Example 26 was thermally treated at 200° C., and it was then reacted with triethylaluminum (in an amount of 1 g to 10 g of aluminum) in a toluene solvent. The soluble components were removed by filtration with a glass filter, and the residue was washed with toluene twice and then dried under reduced pressure. The same polymerization as in Example 26 was carried out except that 1 g of this alumina was used, thereby obtaining 35 g of a polymer (which corresponded to 4.2 kg of polypropylene per gram of zirconium). According to 13C-NMR, a syndiotactic pentad fraction was 0.78, η was 0.66, and MW/MN was 2.5.

COMPARATIVE EXAMPLE 6

Polymerization was carried out by the same procedure as in Example 26 except that a-alumina having a surface area of 10 m²/g was used, thereby obtaining 1 g of a polymer (which corresponded to 0.1 kg of polypropylene per gram of zirconium). According to 13C-NMR, a syndiotactic pentad fraction was 0.75, η was 0.42, and MW/MN was 2.7.

COMPARATIVE EXAMPLE 7

Polymerization was carried out by the same procedure as in Example 26 except that any triethylealuminum was not used, but a polymer was not obtained at all.

EXAMPLE 28

The polymerization of propylene was carried out by the same procedure as in Example 26 except that isopropyl (cyclopentadienyl-1-fluorenyl)zirconium dichloride was replaced with 10 mg of ethylenebis(tetrahydroindenyl) zirconium dichloride and 0.22 g of triethylaluminum was used, thereby obtaining 16 g of a polymer (which corresponded to 7.5 kg of polypropylene per gram of zirconium). According to 13C-NMR, an isotactic pentad fraction was 0.72, η was 0.42, and MW/MN was 2.6.

EXAMPLE 29

The polymerization of butene-1 was carried out by the same procedure as in Example 26 except that 50 g of butene-1 was placed in a 300-milliliter autoclave instead of propylene and a polymerization time was 6 hours, thereby obtaining 7.2 g of a polymer. According to 13C-NMR, a syndiotactic pentad fraction was 0.79, η was 0.20, and MW/MN was 2.2.

EXAMPLE 30

40 mg of isopropyl(cyclopentadienyl-1-fluorenyl) zirconium dichloride was dissolved in 10 ml of toluene, and 0.86 g of triethylaluminum was further added thereto. In addition, 2 g of anhydrous magnesium chloride (made by Toho Titanium Co., Ltd., surface area 9 m²/g) was added thereto, thereby forming a catalyst component. Next, under a nitrogen gas stream, the catalyst component was placed in a 5-liter autoclave which had been sufficiently dried and the atmosphere of which had been replaced with nitrogen, and 1.5 kg of liquid propylene was further added thereto. The contents were then heated up to 50° C. and polymerization was continued for 2 hours. Unreacted propylene was purged, and the contents were taken out and then dried at 60° C. under 70 mmHg for 8 hours to obtain 10 g of a white polypropylene powder (which corresponded to 1.2 kg of polypropylene per gram of zirconium). According to 13C-NMR, a syndiotactic pentad fraction was 0.79, η was 0.43, and MW/MN was 2.5.

COMPARATIVE EXAMPLE 8

Polymerization was carried out by the same procedure as in Example 30 except that any triethylealuminum was not used, but a polymer was not obtained at all.

EXAMPLE 31

The polymerization of propylene was carried out by the same procedure as in Example 30 except that isopropyl (cyclopentadienyl-1-fluorenyl)zirconium dichloride was replaced with 10 mg of ethylenebis(tetrahydroindenyl) zirconium dichloride and 0.22 g of triethylaluminum was used, thereby obtaining 6 g of a polymer (which corresponded to 0.7 kg of polypropylene per gram of zirconium). According to 13C-NMR, an isotactic pentad fraction was 0.86, η was 0.52, and MW/MN was 2.4.

EXAMPLE 32

Under a nitrogen atmosphere, 20 g of magnesium chloride (made by Toho Titanium Co., Ltd., surface area 9 m²/g) and 4 ml of a toluene were placed in a 1-liter grinding pot containing 300 steel balls having a diameter of 12 mm, followed by grinding for 39 hours. The surface area of the ground material was 110 m²/g.

40 mg of isopropyl(cyclopentadienyl-1-fluorenyl) zirconium dichloride was dissolved in 10 ml of toluene, and 0.86 g of triethylaluminum was further added thereto. In addition, 2 g of the above-mentioned ground magnesium compound was added, thereby forming a catalyst component. Next, under a nitrogen gas stream, the catalyst component was placed in a 5-liter autoclave which had been sufficiently dried and the atmosphere of which had been replaced with nitrogen, and 1.5 kg of liquid propylene was added thereto. The contents were then heated up to 50° C. and polymerization was carried out for 2 hours. Unreacted propylene was purged, and the contents were taken out and then dried at 60° C. under 70 mmHg for 8 hours to obtain 156 g of a white polypropylene powder (which corresponded to 18.5 kg of polypropylene per gram of zirconium). According to 13C-NMR, a syndiotactic pentad fraction was 0.78, η was 0.66, and MW/MN was 2.5.

EXAMPLE 33

20 g of anhydrous magnesium chloride (made by Toho Titanium Co., Ltd:, surface area 9 m²/g), 2 g of diphenyldimethoxysilane and 3 ml of decane were placed in a grinding pot, followed by grinding for 34 hours in accordance with the same procedure as in Example 32. The surface area of the ground material was 172 m²/g.

Polymerization was carried out by the same procedure as in Example 32 except that 2 g of this ground magnesium compound was used, to obtain 70 g of a white polypropylene powder (which corresponded to 8.3 kg of polypropylene per gram of zirconium). According to 13C-NMR, a syndiotactic pentad fraction was 0.78, η was 0.66, and MW/MN was 2.5.

EXAMPLE 34

The polymerization of propylene was carried out by the same procedure as in Example 32 except that isopropyl (cyclopentadienyl-1-fluorenyl)zirconium dichloride was replaced with 10 mg of ethylenebis(tetrahydroindenyl) zirconium dichloride and 0.22 g of triethylaluminum was used, thereby obtaining 160 g of a polymer (which corresponded to 72.7 kg of polypropylene per gram of zirconium). η of the polymer was 0.38, an isotactic pentad fraction was 0.82, and MW/MN was 2.6.

EXAMPLE 35

Diphenyldimethoxysilane was replaced with 1.50 g of triethylaluminum, and the grinding as above was conducted. The surface area of the ground material was 107 m²/g. Polymerization was then carried out using this ground material by the same procedure as in Example 32 to obtain 155 g of a polymer. η of the polymer was 0.61, a syndiotactic pentad fraction was 0.81, and MW/MN was 2.6.

EXAMPLE 36

40 mg of isopropyl(cyclopentadienyl-1-fluorenyl) zirconium dichloride was dissolved in 10 ml of toluene, and 19.5 ml of an n-heptane solution containing 2.32 g of n-butylethylmagnesium (trade name MAGALA BEM, made by Toso Akzo Co., Ltd.) was added. Next, under a nitrogen gas stream, the resultant mixture was placed in a 5-liter autoclave which had been sufficiently dried and the atmosphere of which had been replaced with nitrogen, and 1.5 kg of liquid propylene was added thereto. Furthermore, 34.9 ml of a toluene solution containing 5.06 g of diethylaluminum chloride was added thereto, and the contents were then heated up to 60° C. and polymerization was carried out for 2 hours. Unreacted propylene was purged, and the contents were taken out and then dried at 60° C. under 70 mmHg for 8 hours to obtain 172 g of a white polypropylene powder. According to 13C-NMR, a syndiotactic pentad fraction was 0.78, η was 0.65, and MW/MN was 2.2.

EXAMPLE 37

Polymerization was carried out by the same procedure as in Example 36 except that isopropyl(cyclopentadienyl-1-fluorenyl)zirconium dichloride was replaced with dimethylsilylbis(2,4-dimethylcyclopentadienyl)zirconium dichloride, thereby obtaining 33.6 g of a polymer. η of the polymer was 0.25, an isotactic pentad fraction was 0.89, and MW/MN was 2.3.

EXAMPLE 38

One liter of toluene and 0.75 ml of norbornene were placed in a 2-liter autoclave, and there was further added, to the autoclave, a product obtained by reacting, in a toluene solvent, 2 mg of isopropyl(cyclopentadienyl-1-fluorenyl) zirconium dichloride and 43 mg of triethylaluminum so that the amount of an aluminum atom might be 80 mols per mol of a zirconium atom. Next, propylene was added so that the pressure in the autoclave might be 3 kg/cm$^2$G, and a solution prepared by dissolving 9.5 mg of triphenylmethanetetra(pentafluorophenyl)boron in 10 ml of toluene was then added to the autoclave so that the amount of a boron atom might be 2.2 mols per mol of the zirconium atom. While the propylene pressure was maintained at 3 kg/cm$^2$G, the contents were stirred at 20° C. for 2 hours. The contents were filtered and dried to obtain 105 g of a polymer. According to 13C-NMR, the polymer had a syndiotactic pentad fraction of 0.89, η of 0.93, and MW/MN of 2.2. The ash content in the polymer was 275 ppm.

COMPARATIVE EXAMPLE 9

Polymerization was carried out by the same procedure as in Example 38 except that triethylaluminum was replaced with 1.34 g of methylaluminoxane (made by Toso Akzo Co., Ltd., polymerization degree 16.1) and triphenylmethanetetra (pentafluorophenyl)boron was not used, thereby obtaining 102 g of a polymer. I of the polymer was 1.10, a syndiotactic pentad fraction was 0.92, and MW/MN was 2.2. The ash content in the polymer was 10620 ppm.

EXAMPLE 39

The same procedure as in Example 38 was effected except that in polymerization, 1.0 ml of norbornene was used, thereby obtaining 80 g of a polymer. According to 13C-NMR, a syndiotactic pentad fraction of the polymer was 0.89, η was 0.82, and MW/MN was 2.1.

EXAMPLE 40

The same procedure as in Example 38 was effected except that in polymerization, 1.5 ml of norbornene was used, thereby obtaining 53 g of a polymer. According to 13C-NMR, the polymer had a syndiotactic pentad fraction of 0.89, η of 0.73, and MW/MN of 2.2.

EXAMPLE 41

One mg of dimethylsilylbis(2,4-dimethylcyclopentadienyl)zirconium dichloride was dissolved in 10 ml of toluene, and 23 mg of triethylaluminum was added thereto so that the amount of an aluminum atom might be 80 mols per mol of a zirconium atom, thereby forming a catalyst component. This catalyst component was placed in an autoclave containing 1 liter of toluene. Next, propylene was added so that the pressure in the autoclave might be 3 kg/cm$^2$G, and a solution prepared by dissolving 5.1 mg of triphenylmethanetetra(pentafluorophenyl)boron in 10 ml of toluene was then added to the autoclave so that the amount of a boron atom might be 2.2 mols per mol of the zirconium atom. While the propylene pressure was maintained at 3 kg/cm$^2$G, the contents were stirred at 20° C. for 2 hours. The contents were filtered and dried to obtain 156 g of a polymer (which corresponded to 690 kg of polypropylene per gram of zirconium). According to 13C-NMR, an isotactic pentad fraction of the polymer was 0.97, η was 1.02, and MW/MN was 2.4. The ash content in the polymer was 100 ppm.

COMPARATIVE EXAMPLE 10

The polymerization of propylene was carried out by the same procedure as in Example 41 except that triethylaluminum was replaced with 0.27 g of methylaluminoxane (made by Toso Akzo Co., Ltd., polymerization degree 16.1) and triphenylmethanetetra(pentafluorophenyl)boron was not used, thereby obtaining 35 g of a polymer (which corresponded to 155 kg of polypropylene per gram of zirconium). η of the polymer was 1.46, an isotactic pentad fraction was 0.98, and MW/MN was 2.4. The ash content in the polymer was 5500 ppm.

EXAMPLE 42

In place of dimethylsilylbis(2,4-dimethylcyclopentadienyl)zirconium dichloride, 2 mg of dimethylsilylbis(2,3,5-trimethylcyclopentadienyl)zirconium dichloride and 40 mg of triethylaluminum were dissolved in 10 ml of toluene to form a catalyst component, and this catalyst component was placed in an autoclave containing 1 liter of toluene. Next, propylene was added so that the pressure in the autoclave might be 3 kg/cm$^2$G, and the same procedure as in Example 41 was effected except that a solution prepared by dissolving 10 mg of triphenylmethanetetra(pentafluorophenyl)boron in 10 ml of toluene was then added to the autoclave, thereby obtaining 47 g of a polymer (which corresponded to 108 kg of polypropylene per gram of zirconium). η of the polymer was 1.52, an isotactic pentad fraction was 0.98, and MW/MN was 2.4.

COMPARATIVE EXAMPLE 11

The polymerization of propylene was carried out by the same procedure as in Example 41 except the following steps. A solution prepared by dissolving 9.5 mg of triphenylmethanetetra(pentafluorophenyl)boron in 10 ml of toluene was added to another solution prepared by dissolving 2 mg of dimethylsilylbis(2,4-dimethylcyclopentadienyl) zirconium dichloride in 10 ml of toluene to form a catalyst component, and 1 liter of toluene was then placed in a 2-liter autoclave. Furthermore, 46 mg of triethylaluminum was added and the above-mentioned catalyst component was then added thereto, thereby obtaining 5 g of a polymer (which corresponded to 11 kg of polypropylene per gram of zirconium). η of the polymer was 0.98, an isotactic pentad fraction was 0.97, and MW/MN was 2.3.

COMPARATIVE EXAMPLE 12

The polymerization of propylene was carried out by the same procedure as in Example 41 except the following steps. 9.5 mg of triphenylmethanetetra(pentafluorophenyl) boron was dissolved in 10 ml of toluene, and 46 mg of triethylaluminum was added thereto. The resultant mixture was placed in a 2-liter autoclave containing 1 liter of toluene. Next, propylene was added so that the pressure might be 3 kg/cm$^2$G, and a solution prepared by dissolving 2 mg of dimethylsilylbis(2,4-dimethylcyclopentadienyl)zirconium dichloride in 10 ml of toluene was added to the autoclave. In this case, a polymer was not obtained at all.

EXAMPLE 43

The polymerization of propylene was carried out by the same procedure as in Example 41 except that triethylaluminum was replaced with triisobutylaluminum so that the molar ratio of aluminum to zirconium might be unchanged, thereby obtaining 188 g of a powder. η of this powder was 1.20, an isotactic pentad fraction was 0.98, and MW/MN was 2.3.

EXAMPLE 44

The polymerization of propylene was carried out by the same procedure as in Example 41 except that triphenylmethanetetra(pentafluorophenyl)boron was replaced with 10.8 mg of tri(pentafluorophenyl)boron, thereby obtaining 56 g of a powder. η of this powder was 1.01, an isotactic pentad fraction was 0.96, and MW/MN was 2.4.

EXAMPLE 45

Two mg of isopropyl(cyclopentadienyl-1-fluorenyl)zirconium dichloride was dissolved in 10 ml of toluene, and 75 mg of triisobutylaluminum was added thereto so that the amount of an aluminum atom might be 80 mols per mol of a zirconium atom, followed by mixing. The resultant mixture was placed in a 2-liter autoclave containing 1 liter of toluene. Next, propylene was added so that the pressure might be 3 kg/cm$^2$G, and a solution prepared by dissolving 9.5 mg of triphenylmethanetetra(pentafluorophenyl)boron in 10 ml of toluene was then added to the autoclave so that the amount of a boron atom might be 2.2 mols per mol of the zirconium atom. While the propylene pressure was maintained at 3 kg/cm$^2$G, the contents were stirred at 20° C. for 2 hours. The contents were filtered and dried to obtain 193 g of a polymer. The amount of the produced polypropylene per gram of zirconium in the catalyst was 458 kg. According to 13C-NMR, a syndiotactic pentad fraction of the polymer was 0.89, η was 1.17, and MW/MN was 2.1.

On the other hand, for the comparison with the above-mentioned results, the following operation was made.

Two mg of isopropyl(cyclopentadienyl-1-fluorenyl)zirconium dichloride was dissolved in 10 ml of toluene, and 75 mg of triisobutylaluminum was added thereto and then mixed. Furthermore, a solution prepared by dissolving 9.5 mg of triphenylmethanetetra(pentafluorophenyl)boron in 10 ml of toluene was then added thereto, thereby obtaining a catalyst component.

Next, this catalyst component was placed in a 2-liter autoclave containing 1 liter of toluene. Propylene was then added so that the pressure might be 3 kg/cm$^2$G, followed by stirring at 20° C. for 2 hours. The contents were filtered and dried to obtain 29.4 g of a polymer. The amount of the produced polypropylene per gram of zirconium in the catalyst was 68 kg. According to 13C-NMR, a syndiotactic pentad fraction of the polymer was 0.88, η was 1.16, and MW/MN was 2.2.

It can be understood from the foregoing that when the reaction product of isopropyl(cyclopentadienyl-1-fluorenyl)zirconium dichloride and triisobutylaluminum is brought into contact with propylene prior to the contact with triphenylmethanetetra(pentafluorophenyl)boron, polymerization activity can be remarkably improved.

EXAMPLE 46

The polymerization of propylene was carried out by the same procedure as in Example 45 except that triisobutylaluminum was replaced with 43 mg of triethylaluminum so that the molar ratio of aluminum to zirconium might be unchanged and triphenylmethanetetra(pentafluorophenyl)boron was replaced with 9.7 mg of triphenylmethanetetra(pentafluorophenyl)aluminum so that the molar ratio of the aluminum atom to the zirconium atom was equal to that of a boron atom to the zirconium atom, thereby obtaining 160 g of a powder. The amount of the produced polypropylene per gram of zirconium in the catalyst was 380 kg. According to 13C-NMR, a syndiotactic pentad fraction of the polymer was 0.91, η was 1.24, and MW/MN was 2.0.

EXAMPLE 47

The polymerization of propylene was carried out by the same procedure as in Example 45 except that triisobutylaluminum was replaced with 43 mg of triethylaluminum so that the molar ratio of aluminum to zirconium might be unchanged and triphenylmethanetetra(pentafluorophenyl)boron was replaced with 10.1 mg of triphenylmethanetetra(pentafluorophenyl)gallium so that the molar ratio of a gallium atom to the zirconium atom was equal to that of a boron atom to the zirconium atom, thereby obtaining 184 g of a powder. The amount of the produced polypropylene per gram of zirconium in the catalyst was 437 kg. According to 13C-NMR, a syndiotactic pentad fraction of the polymer was 0.91, η was 1.22, and MW/MN was 2.0.

EXAMPLE 48

The polymerization of propylene was carried out by the same procedure as in Example 45 except the following steps. Two mg of isopropyl(cyclopentadienyl-1-fluorenyl)zirconium dichloride was dissolved in 10 ml of toluene, and in place of triisobutylaluminum, an n-heptane solution containing 10.2 mg of n-butylethylmagnesium (trade name MAGALA BEM, made by Toso Akzo Co., Ltd.) was added thereto, thereby forming a catalyst component. Afterward, 32 mg of triethylaluminum was placed in a 2-liter autoclave containing 1 liter of toluene, and the above-mentioned catalyst component was added to the autoclave, thereby obtaining 116 g of a powder. The amount of the produced polypropylene per gram of zirconium in the catalyst was 275 kg. According to 13C-NMR, the polymer had a syndiotactic pentad fraction of 0.89, η of 1.07, and Mw/MN of 2.2.

On the other hand, for the comparison with the above-mentioned results, the polymerization of propylene was carried out in the same manner as described above except that n-butylethylmagnesium was not used. In this case, 2 g of a polymer was merely obtained.

EXAMPLE 49

The polymerization of propylene was carried out by the same procedure as in Example 45 except the following steps.

Two mg of isopropyl(cyclopentadienyl-1-fluorenyl) zirconium dichloride was dissolved in 10 ml of toluene, and in place of triisobutylaluminum, a n-heptane solution containing 11.4 mg of diethylzinc was added thereto and then mixed to form a catalyst component. 32 mg of triethylaluminum was placed in a 2-liter autoclave containing 1 liter of toluene, and the above-mentioned catalyst component was further added to the autoclave, thereby obtaining 22.7 g of a powder. The amount of the produced polypropylene per gram of zirconium in the catalyst was 54 kg. According to 13C-NMR, the polymer had a syndiotactic pentad fraction of 0.88, η of 1.14, and MW/MN of 2.1.

What is claimed is:

1. A method for polymerizing an α-olefin comprising by bringing the α-olefin into contact with a catalyst which is obtained by reacting a halogenated metallocene compound with an organometallic compound, and then bringing the resultant reaction product into contact with an ionic compound or an electrophilic compound; wherein the halogenated metallocene compound is a compound represented by the formula (I) or (II)

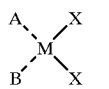
(I)

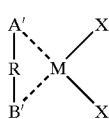
(II)

wherein A and B or A' and B' are mutually identical or different and are unsaturated hydrocarbon residues coordinated to a central atom; R is a divalent straight-chain hydrocarbon residue which may have a side chain; or a residue in which a part or all of the carbon atoms of the straight-chain may be substituted by silicon atoms, germanium atoms or tin atoms; X is a halogen atom; and M is a zirconium atom or a hafnium atom; the organometallic compound is triethylaluminum, tripropylaluminum, triisopropylaluminum, tributylaluminum, triisobutylaluminum, tripentylaluminum, trihexylaluminum, triheptylaluminum, trioctylaluminum, tridecylaluminum, isoprenylaluminum, diethylaluminum hydride, diisopropylaluminum hydride, diisobutylaluminum hydride, diethylzinc, diphenylzinc, divinylzinc, dimethylmagnesium, diethylmagnesium, dibutylmagnesium, dihexylmagnesium or butylethylmagnesium; the ionic compound is represented by the formula (V)

(V)

wherein Q is a cationic component of the ionic compound, and is selected from carbonium cation, tropylium cation, ammonium cation, oxonium cation, sulfonium cation and phosphonium cation, cations of metals and cations of organometals which are easily reduced, Y is an anionic component of the ionic compound selected from the anionic components of an ionic organoboron, organoaluminum, organogallium, organophosphorus, organoarsenic and organoantimony, and m denotes valency and the electrophilic compound comprises magnesium halides or inorganic oxides having Lewis acidity, which method is performed in the absence of an aluminoxane.

2. The method of claim 1, wherein the ionic compound or the electrophilic compound is brought into contact with the reaction product of the metallocene compound and the organometallic compound, said reaction product having been supported on a carrier prior to the contact with the ionic compound or the electrophilic compound.

3. The method of claim 1, wherein the halogenated metallocene compound is a compound represented by the formula (IV)

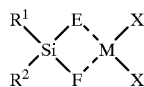
(IV)

wherein each of E and F is a di- or tri-substituted cyclopentadienyl group having a hydrocarbon residue having 1 to 10 carbon atoms, a silyl group or a halogen atom as a substituent; $R^1$ and $R^2$ may be identical or different and bonded to silicon which is linked with the two cyclopentadienyl groups, and each of $R^1$ and $R^2$ is a hydrogen atom or a hydrocarbon residue having 1 to 10 carbon atoms; X is a halogen atom; and M is, a zirconium atom or a hafnium atom.

4. The method of claim 3, wherein $R^1$ is a hydrocarbon residue selected from the group consisting of methyl, ethyl, propyl, butyl, pentyl, hexyl, cyclopentyl, cyclohexyl and phenyl.

5. The method of claim 3, wherein $R^2$ is a hydrocarbon residue selected from the group consisting of methyl, ethyl, propyl, butyl, pentyl, hexyl, cyclopentyl, cyclohexyl and phenyl.

6. The method of claim 3, wherein X is selected from the group consisting of fluorine, chlorine, bromine and iodine.

7. The method of claim 1, wherein the electrophilic compound is water-free aluminum oxide having a specific surface area of from 15 to 500 m²/g.

8. The method of claim 1 wherein the organometallic compound is selected from the group consisting of methylmagnesium chloride, methylmagnesium bromide, ethylmagnesium chloride, propylmagnesium chloride and butylmagnesium chloride.

* * * * *

UNITED STATES PATENT AND TRADEMARK OFFICE
CERTIFICATE OF CORRECTION

PATENT NO. : 6,121,394
DATED : September 19, 2000
INVENTOR(S) : Ryuichi Sugimoto et al.

It is certified that error appears in the above-identified patent and that said Letters Patent is hereby corrected as shown below:

Title page,
Item [30], For the second named priority document 2-202455, change the priority date to -- Aug. 1, 1990 --; for the eighth named priority document 3-017371, change the priority date to -- Feb. 12, 1991 --.

Signed and Sealed this

Twenty-fifth Day of September, 2001

Attest:

*Attesting Officer*

NICHOLAS P. GODICI
*Acting Director of the United States Patent and Trademark Office*